(12) United States Patent
Yamazaki et al.

(10) Patent No.: US 7,327,428 B2
(45) Date of Patent: Feb. 5, 2008

(54) ELECTRO-OPTICAL DEVICE AND METHOD OF MANUFACTURING THE SAME

(75) Inventors: Katsunori Yamazaki, Matsumoto (JP); Eiji Okamoto, Matsumoto (JP); Tsuyoshi Maeda, Yamanashi (JP); Kimitaka Kamijo, Shiojiri (JP); Daisuke Nagano, Matsumoto (JP); Takumi Seki, Misato-mura (JP); Akira Inoue, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 10/928,447

(22) Filed: Aug. 30, 2004

(65) Prior Publication Data

US 2005/0231673 A1    Oct. 20, 2005

(30) Foreign Application Priority Data

Sep. 12, 2003   (JP) .............................. 2003-321800
May 31, 2004   (JP) .............................. 2004-160901

(51) Int. Cl.
    *G02F 1/1343*    (2006.01)
(52) U.S. Cl. ..................................... 349/141
(58) Field of Classification Search ................. 349/141
    See application file for complete search history.

(56) References Cited

U.S. PATENT DOCUMENTS

| 6,124,916 | A | 9/2000 | Kaneko et al. |
| 6,233,034 | B1 | 5/2001 | Lee et al. |
| 6,970,222 | B2 * | 11/2005 | Nakayoshi et al. ......... 349/139 |
| 2002/0048163 | A1 * | 4/2002 | Kawakami et al. ........... 362/31 |

FOREIGN PATENT DOCUMENTS

| CN | 1333478 A | 1/2002 |
| JP | A 10-010494 | 1/1998 |
| JP | A 11-337980 | 12/1999 |
| JP | A 2000-162602 | 6/2000 |
| JP | A-2002-025326 | 1/2002 |
| JP | A 2003-87734 | 3/2003 |
| KR | 1999-01 4697 | 2/1999 |
| KR | 10-0341123 | 6/2002 |

* cited by examiner

*Primary Examiner*—David Nelms
*Assistant Examiner*—Phu Vu
(74) *Attorney, Agent, or Firm*—Oliff & Berridge, PLC

(57) ABSTRACT

To simplify a manufacturing process of a transverse electric field mode liquid crystal display device by using a non-linear resistance element such as a TFD (Thin Film Diode) as a switching element. In a liquid crystal display device having a pair of substrates with liquid crystal interposed therebetween, one of the substrates consists of an electrode substrate. On the electrode substrate, there are provided a first group of electrodes, a second group of electrodes crossing the first group of electrodes with an insulating layer interposed therebetween, non-linear resistance elements, one end of each of the non-linear resistance elements being connected to the respective one of the second group of electrodes, and pixel electrodes opposing the first group of electrodes, each pixel electrode being connected to the other end of each of the non-linear resistance elements. Since the non-linear resistance elements have a so-called TFD (MIM) structure made of metal-insulating layer-metal, the manufacturing process is simple. Therefore, it is possible to manufacture the transverse electric field mode display device at low cost.

14 Claims, 28 Drawing Sheets

(PROCESS P4)

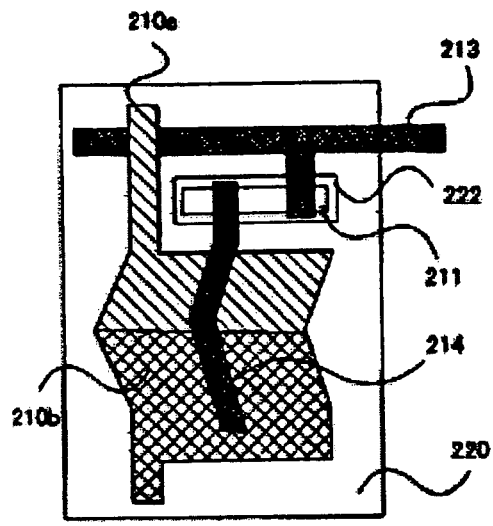 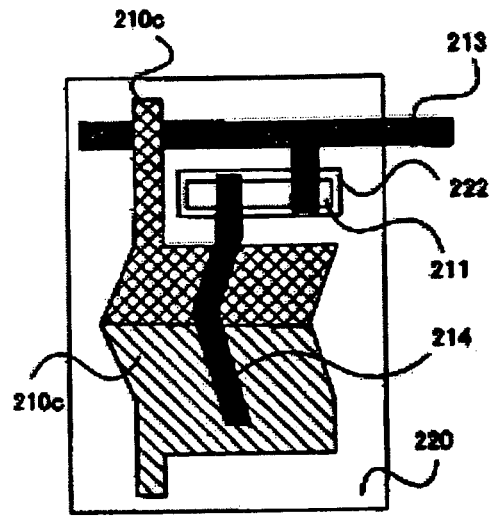
FIG. 18A  FIG. 18B
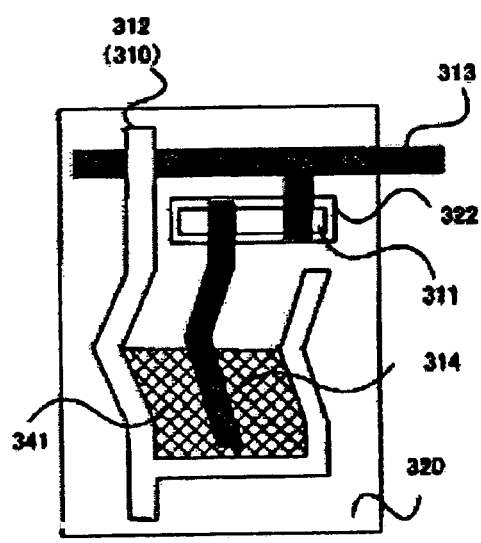
FIG. 19

FIG. 26

<POLARITY OF SELECTION VOLTAGE>

| | Frame | 1 | 2 | 3 | 4 | 5 | 6 | 7 | 8 | 9 | 10 | 11 | 12 | 13 |
|---|---|---|---|---|---|---|---|---|---|---|---|---|---|---|
| BLOCK | 1ST ROW | + | − | + | − | + | − | + | − | + | − | + | − | + |
| | 2ND ROW | − | + | − | + | − | + | − | + | − | + | − | + | − |
| | 3RD ROW | + | − | + | − | + | − | + | − | + | − | + | − | + |
| | 4TH ROW | − | + | − | + | − | + | − | + | − | + | − | + | − |
| BLOCK | 5TH ROW | − | + | − | + | − | + | − | + | − | + | − | + | − |
| | 6TH ROW | + | − | + | − | + | − | + | − | + | − | + | − | + |
| | 7TH ROW | − | + | − | + | − | + | − | + | − | + | − | + | − |
| | 8TH ROW | + | − | + | − | + | − | + | − | + | − | + | − | + |
| | 9TH ROW | + | − | + | − | + | − | + | − | + | − | + | − | + |
| | 10TH ROW | − | + | − | + | − | + | − | + | − | + | − | + | − |
| | 11TH ROW | + | − | + | − | + | − | + | − | + | − | + | − | + |
| | 12TH ROW | − | + | − | + | − | + | − | + | − | + | − | + | − |
| | 13TH ROW | − | + | − | + | − | + | − | + | − | + | − | + | − |
| | 14TH ROW | + | − | + | − | + | − | + | − | + | − | + | − | + |
| | 15TH ROW | − | + | − | + | − | + | − | + | − | + | − | + | − |
| | 16TH ROW | + | − | + | − | + | − | + | − | + | − | + | − | + |
| | 17TH ROW | + | − | + | − | + | − | + | − | + | − | + | − | + |
| | 18TH ROW | − | + | − | + | − | + | − | + | − | + | − | + | − |
| | 19TH ROW | + | − | + | − | + | − | + | − | + | − | + | − | + |
| | 20TH ROW | − | + | − | + | − | + | − | + | − | + | − | + | − |
| | 21ST ROW | − | + | − | + | − | + | − | + | − | + | − | + | − |
| | 22ND ROW | + | − | + | − | + | − | + | − | + | − | + | − | + |
| | 23RD ROW | − | + | − | + | − | + | − | + | − | + | − | + | − |
| | 24TH ROW | + | − | + | − | + | − | + | − | + | − | + | − | + |
| | 25TH ROW | + | − | + | − | + | − | + | − | + | − | + | − | + |
| | 26TH ROW | − | + | − | + | − | + | − | + | − | + | − | + | − |
| | 27TH ROW | + | − | + | − | + | − | + | − | + | − | + | − | + |
| | 28TH ROW | − | + | − | + | − | + | − | + | − | + | − | + | − |
| SCANNING LINE | 29TH ROW | − | + | − | + | − | + | − | + | − | + | − | + | − |
| | 30TH ROW | + | − | + | − | + | − | + | − | + | − | + | − | + |
| | 31ST ROW | − | + | − | + | − | + | − | + | − | + | − | + | − |
| | 32ND ROW | + | − | + | − | + | − | + | − | + | − | + | − | + |
| | 33RD ROW | + | − | + | − | + | − | + | − | + | − | + | − | + |

ELECTRO-OPTICAL DEVICE AND METHOD OF MANUFACTURING THE SAME

BACKGROUND OF THE INVENTION

1. Field of Invention

The present invention relates to an electro-optical device, such as a liquid crystal display device. The present invention also relates to a transverse electric field mode liquid crystal display device.

2. Description of Related Art

In related art TN (Twisted Nematic) mode liquid crystal display devices, alignment of liquid crystal molecules is controlled by sealing liquid crystal between two transparent substrates and applying an electric field in a vertical direction to the substrate via a transparent electrode provided on each of the substrates. Related art document Japanese Unexamined Patent Application Publication No. 2000-162602 discloses that an electric field is applied to liquid crystal in a nearly parallel direction to the substrate. This is referred to as a transverse electric field mode or an IPS (In-Plane Switching) mode.

In the related art liquid crystal display device, a TFT (Thin Film Transistor) driving method in which a thin film transistor is used as a switching element is adopted. However, since, in order to form a TFT element, it is necessary to perform exposure, development and etching processes in a number of times, the manufacturing process becomes complicated to consequently increase the manufacturing cost.

Also, in related art vertical electric field driving mode liquid crystal panel, the related art includes a signal voltage generated by pulse-width-modulation or voltage-modulation based on display data. However, display quality deteriorates because of the occurrence of transverse irregularity or vertical crosstalk on display image. Related art documents Japanese Unexamined Patent Application Publication No. 2003-87734 and Japanese Unexamined Patent Application Publication No. 11-337980 suggest that a shield structure be provided between pixel electrodes of a liquid crystal panel. However, such a shield structure results in a decreasing aperture ratio.

SUMMARY OF THE INVENTION

Exemplary embodiments of the present invention simplify a manufacturing process of a transverse electric field mode liquid crystal display device by using a non-linear resistance element such as a TFD (Thin Film Diode) as a switching element.

According to a first exemplary embodiment of the present invention, there is provided an electro-optical device having a pair of substrates with electro-optical material interposed therebetween. The first exemplary embodiment includes a first group of electrodes on one of the substrates; a second group of electrodes crossing the first group of electrodes with an insulating layer interposed therebetween; non-linear resistance elements, one end of each of the non-linear resistance elements being connected to a respective one of the second group of electrodes; and pixel electrodes opposing the first group of electrodes, each pixel electrode being connected to the other end of each of the non-linear resistance elements.

The electro-optical device may be, for example, a liquid crystal display device having a pair of substrates with liquid crystal, which is electro-optical material, interposed therebetween. One of the substrates is made as an electrode substrate. On the electrode substrate, there are provided a first group of electrodes, a second group of electrodes crossing the first group of electrodes with the insulating layer interposed therebetween, non-linear resistance elements, one end of each of the non-linear resistance elements being connected to the respective one of the second group of electrodes, and pixel electrodes opposing the first group of electrodes, each pixel electrode being connected to the other end of each of the non-linear resistance elements. In such a manner, the second group of electrodes are respectively connected to one ends of the non-linear resistance elements, and the pixel electrodes are respectively connected to the other ends of the non-linear resistance elements. In addition, the pixel electrodes arranged to oppose the first group of electrodes. Therefore, a so-called transverse electric field is generated in a substantially parallel direction to a flat surface of the substrate by conducting between the first group of electrodes and the pixel electrodes, and thus alignment of electro-optical material such as liquid crystal is controlled by the transverse electric field. Further, since the non-linear resistance elements have a so-called TFD (MIM) structure made of metal-insulating layer-metal, the manufacturing process is simple. Therefore, the transverse electric field mode display device can be manufactured at low cost.

In an exemplary aspect of the electro-optical device, the non-linear resistance elements may be formed by oxidizing material composing the first group of electrodes. Further, the insulating layer may be formed by oxidizing the first group of electrodes. In such a manner, the insulating layer can be easily formed, for example, by means of anode oxidization process or other oxidization processes.

In another exemplary aspect of the electro-optical device, a portion of each of the pixel electrodes may overlap the respective one of the first group of electrodes with the insulating layer interposed therebetween. In such a manner, storage capacitor can be formed on the overlap portion.

In still another exemplary aspect of the electro-optical device, a portion of the first group of electrodes may be covered with material composing the second group of electrodes. In addition, base electrodes made of material composing the first group of electrodes may be provided under the second group of electrodes. In such a manner, it is possible to reduce resistances of a portion of the first group of electrodes and the second group of electrodes.

In a further exemplary aspect of the electro-optical device, the insulating layer may be made of a resin layer. In this case, the resin layer may be provided only in areas where the first group of electrodes and the second group of electrodes cross each other or may be provided in an entire area excluding the area of the non-linear resistance elements. In addition, the resin layer may be used as a color filter layer. Accordingly, an additional color filter layer is not required.

In a still further exemplary aspect of the electro-optical device, a single display unit may consist of a single electrode line in the first group of electrodes, a pair of non-linear resistance elements provided on both sides of the electrode line, and a pair of pixel electrodes provided on both sides of the electrode line. In such a manner, even though one pixel electrode is defective, display becomes possible by other pixel electrode.

In this case, the non-linear resistance elements may have different electrical characteristics. Also, gaps between the electrode line and each of the pixel electrodes may be different from each other. By making lengths of the non-linear resistance elements and/or gaps between the electrode line and each of the pixel electrodes different from each other, display characteristics in areas of the pixel electrodes are made different from each other, thus it is possible to enhance or improve viewing angle.

Further, in another exemplary aspect of the electro-optical device, the pixel electrode may be surrounded by a portion of the respective one of the first group of electrodes, and the electro-optical device may further include a driving circuit to apply a scanning voltage to the first group of electrodes and to apply a driving voltage pulse-width-modulated based on display data to the second group of electrodes. Thus, it is possible to display image data on the electro-optical panel. In a general vertical electric field mode liquid crystal display device, when a driving method using pulse width modulation is adopted, a transverse irregularity occurs on display image. However, in the above-mentioned electro-optical device, since each of the pixel electrodes is surrounded by a portion of the respective one of the first group of electrodes to be electrically shielded, it is possible to reduce or prevent transverse irregularities.

According to another exemplary embodiment of the present invention, there is provided an electro-optical device having a pair of substrates with electro-optical material interposed therebetween. The exemplary embodiment includes an electrode layer provided on one of the substrates; a group of electrodes provided on the electrode layer with an insulating layer interposed therebetween; non-linear resistance elements, one end of each of the non-linear resistance elements being connected to a respective one of the group of electrodes; and pixel electrodes provided on the electrode layer with the insulating layer interposed therebetween, each pixel electrode being connected to the other end of each of the non-linear resistance elements.

The electro-optical device may be, for example, a liquid crystal display device having a pair of substrates with liquid crystal, which is electro-optical material, interposed therebetween. On one of the substrates, there are provided an electrode layer, a group of electrodes provided on the electrode layer with an insulating layer interposed therebetween, non-linear resistance elements, one end of each of the non-linear resistance elements being connected to the respective one of the group of electrodes, and pixel electrodes provided on the electrode layer with the insulating layer interposed therebetween, each pixel electrode being connected to the other end of each of the non-linear resistance elements. Therefore, a so-called transverse electric field is generated in a substantially parallel direction to a flat surface of the substrate by conducting between the electrode layer and the pixel electrodes, and thus alignment of electro-optical material such as liquid crystal is controlled by the transverse electric field. Further, since the non-linear resistance elements have a so-called TFD (MIM) structure made of metal-insulating layer-metal, the manufacturing process is simple. Therefore, the transverse electric field mode display device can be manufactured at low cost.

In the above electro-optical device, it is possible to implement transmissive display when the electrode layer is made of transparent material, and it is possible to implement reflective display when the electrode layer is made of reflective material.

In a further exemplary aspect of the electro-optical device, each of the pixel electrodes may be surrounded by a portion of the respective one of the first group of electrodes, and the device may further include a driving circuit to apply a scanning voltage to the electrode layer and to apply a driving voltage voltage-modulated based on display data to the group of electrodes. Thus, it is possible to display image data on an electro-optical panel. In a general vertical electric field mode liquid crystal display device, when a driving method using voltage modulation is adopted, vertical crosstalk occurs on display image. However, in the above-mentioned electro-optical device, since the pixel electrode is surrounded by the electrode layer to be electrically shielded, it is possible to prevent vertical crosstalk.

According to another exemplary embodiment of the present invention, there is provided a method of manufacturing an electro-optical device having a pair of substrates with electro-optical material interposed therebetween. The exemplary embodiment includes a first step of forming and oxidizing an electrode on one of the substrates; a second step of separating a portion of the electrode to form a first group of electrodes and non-linear resistance elements; a third step of forming an insulating layer on the first group of electrodes; and a fourth step of forming a second group of electrodes crossing the first group of electrodes with the insulating layer interposed therebetween. Respective ones of the second group of electrodes being connected to one end of each of the non-linear resistance elements, and pixel electrodes opposing the first group of electrodes, each pixel electrode being connected to the other end of each of the non-linear resistance elements.

The electro-optical device may be, for example, a liquid crystal display device having a pair of substrates with liquid crystal, which is electro-optical material, interposed therebetween. The respective one of the first group of electrodes is connected to one end of each of the non-linear resistance elements, and each of the pixel electrodes is connected to the other end of each of the non-linear resistance elements. Also, the pixel electrodes oppose the first group of electrodes. Therefore, a so-called transverse electric field is generated in a substantially parallel direction to a flat surface of the substrate by conducting between the first group of electrodes and the pixel electrodes, and thus alignment of electro-optical material such as liquid crystal is controlled by the transverse electric field. Further, since the non-linear resistance elements have a so-called TFD (MIM) structure made of metal-insulating layer-metal, the manufacturing process is simple. Therefore, the transverse electric field mode display device can be manufactured at low cost.

In the exemplary methods of manufacturing an electro-optical device, the insulating layer may be formed by oxidizing the first group of electrodes and may be formed by coating a resin layer on the first group of electrodes.

Further, by forming the second group of electrodes on a portion of the first group of electrodes, it is possible to reduce resistances of the first group of electrodes. Also, by further forming electrodes in areas corresponding to the second group of electrodes in the first step, it is possible to reduce resistance of the second group of electrodes.

According to another exemplary embodiment of the present invention, there is provided a method of manufacturing an electro-optical device having a pair of substrates with electro-optical material interposed therebetween. The exemplary embodiment includes a first step of forming an electrode layer on one of the substrates; a second step of separating a portion of the electrode layer to form non-linear resistance elements; a third step of forming an insulating layer on the electrode layer; and a fourth step of forming a group of electrodes, respective ones of the group of electrodes being connected to one end of each of the non-linear resistance elements, and pixel electrodes, each pixel electrode being connected to the other end of each of the non-linear resistance elements.

The electro-optical device may be, for example, a liquid crystal display device having a pair of substrate with liquid crystal, which is electro-optical material, interposed therebetween. On one of the substrates, there are provided an electrode layer, a group of electrodes provided on the electrode layer with an insulating layer interposed therebetween, non-linear resistance elements, one end of each of the non-linear resistance elements being connected to the respective one of the group of electrodes, and pixel electrodes provided on the electrode layer with the insulating layer interposed therebetween, each pixel electrode being connected to the other end of each of the non-linear resistance elements. Therefore, a so-called transverse electric field is generated in a substantially parallel direction to a flat surface of the substrate by conducting between the electrode layer and the pixel electrodes, and thus alignment of electro-optical material such as liquid crystal is controlled by the transverse electric field. Further, since the non-linear resistance elements have a so-called TFD (MIM) structure made of metal-insulating layer-metal, the manufacturing process is simple. Therefore, the transverse electric field mode display device can be manufactured at low cost.

BRIEF DESCRIPTION OF THE DRAWINGS

FIGS. 18A and B are a schematic plan view showing an electrode structure according to a ninth exemplary embodiment;

FIG. 19 is a schematic plan view showing an electrode structure according to a tenth exemplary embodiment;

FIG. 26 is a time table showing a polarity of a selected voltage which is applied to each row of a display device;

DETAILED DESCRIPTION OF PREFERRED EMBODIMENTS

Exemplary embodiments according to the present invention will be now described with reference to the accompanying drawings.

[Entire Configuration of Liquid Crystal Display Device]

Figure 1:
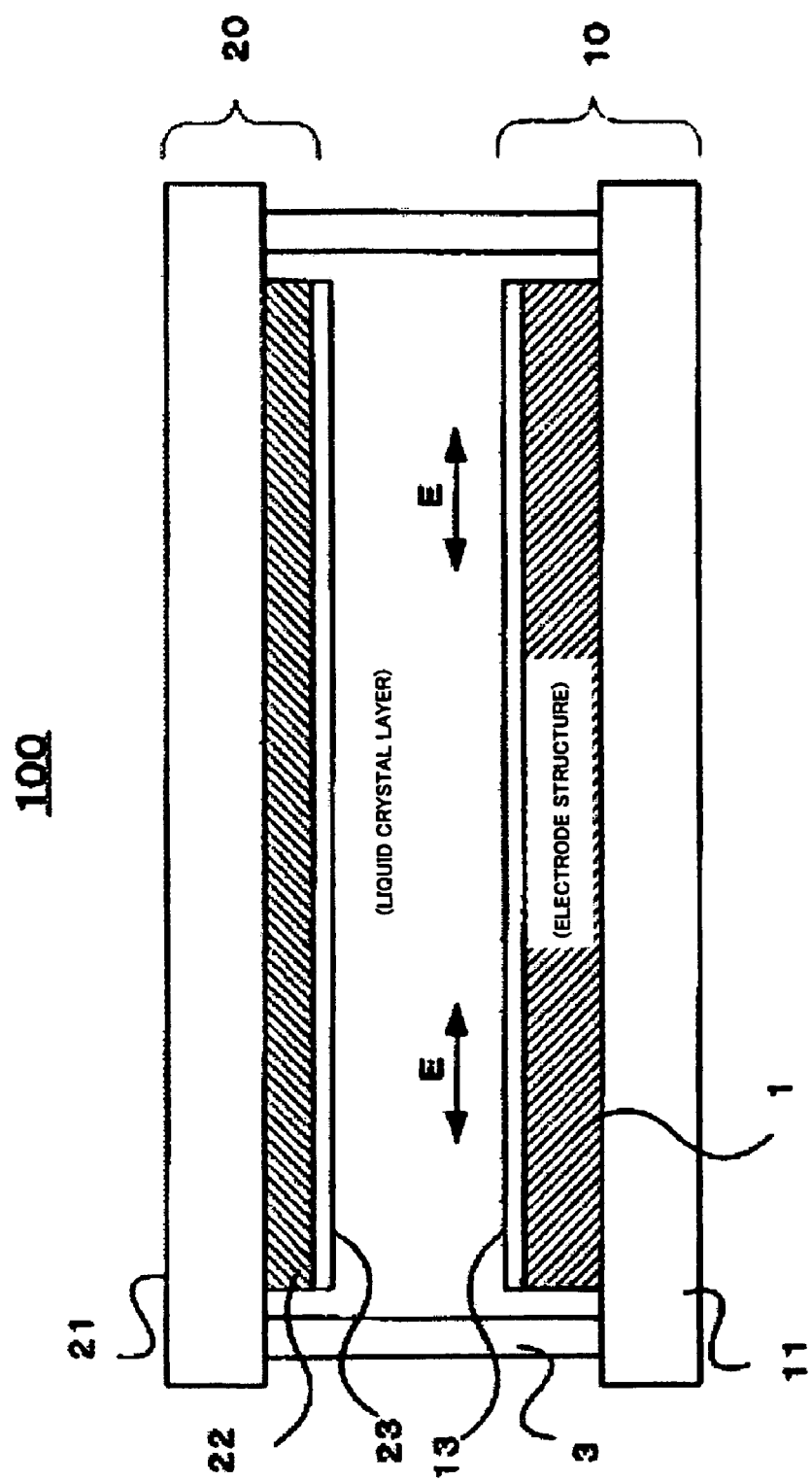
FIG. 1 is a schematic showing a liquid crystal display device to which exemplary embodiments of the present invention are applied.

FIG. 1 is a schematic showing a liquid crystal display device to which exemplary embodiments of the present invention are applied. In a liquid crystal display device 100, a transverse electric field mode such as IPS (In-Plane Switching) or FFS (Fringe Field Switching) mode is utilized. In a related art vertical driving mode liquid crystal display device, alignment of liquid crystal is controlled by applying a driving electric field to the liquid crystal interposed between two transparent substrates in the direction perpendicular to the transparent substrate. To the contrary, in the transverse electric field mode liquid crystal display device, alignment of liquid crystal is controlled by applying a driving electric field to the liquid crystal in a substantially horizontal direction to a surface of the transparent substrate in one side of the substrate on which an electrode structure is provided.

In FIG. 1, the liquid crystal display device 100 is made by bonding a lower substrate 10 and an upper substrate 20 via a sealing material 3, and sealing liquid crystal therebetween. The lower substrate 10 is referred to as 'an electrode substrate' since a transverse electric field mode electrode structure described below is formed.

In FIG. 1, the lower substrate 10 comprises a transparent substrate 11 such as a glass substrate. A various transverse electric field mode electrode structure 1 described below is formed on an inner surface (an upper side in the FIG. 1) of the transparent substrate 11. Further, an alignment film 13 is formed on the electrode structure 1. Similarly, the upper substrate 20 comprises a transparent substrate 21 such as a glass substrate. A color filter 22 is formed on an inner side (a lower side in the FIG. 1) of the transparent substrate 21, and an alignment film 23 is formed on a lower side of the color filter 22. The electrode structure 1 causes a transverse electric field E to be generated, as shown by an arrow, and alignment of liquid crystal within a liquid crystal layer is controlled by the electric field E. Exemplary embodiments of the present invention are basically characterized in that the electrode structure 1 is a TFD structure.

A preferred exemplary embodiment of the electrode structure 1 will be now described in detail.

First Exemplary Embodiment

Figure 2:
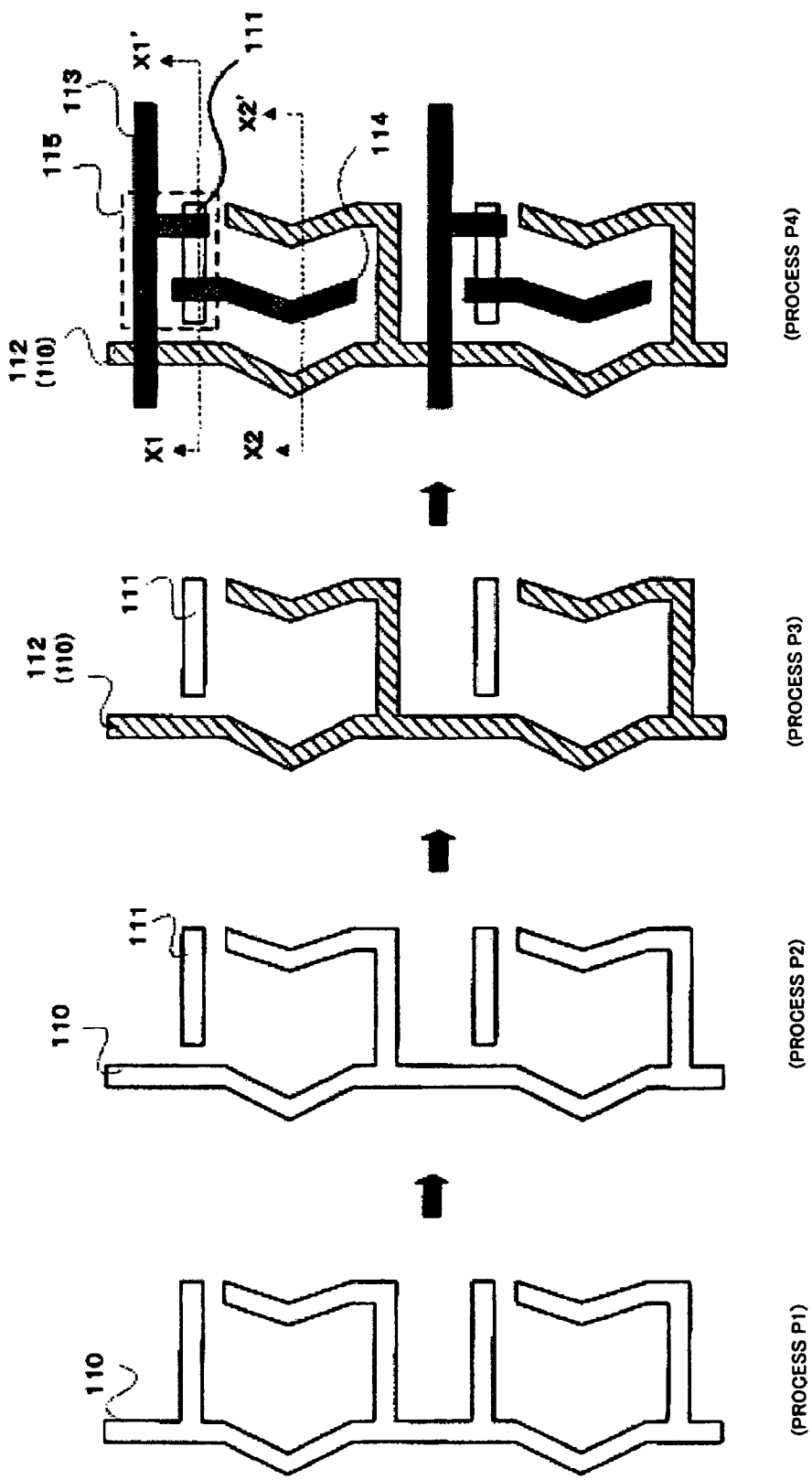
FIG. 2 is a schematic plan view showing a manufacturing process of an electrode structure according to a first exemplary embodiment.
Figure 3A:
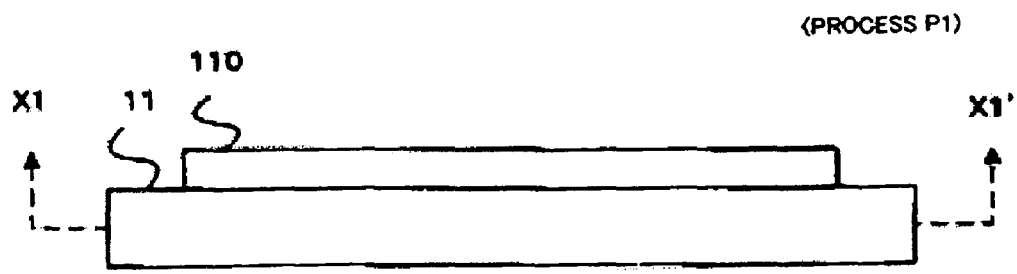
FIGS. 3A-3D are schematic cross-sectional views showing the manufacturing process of the electrode structure according to the first exemplary embodiment.
Figure 3B:
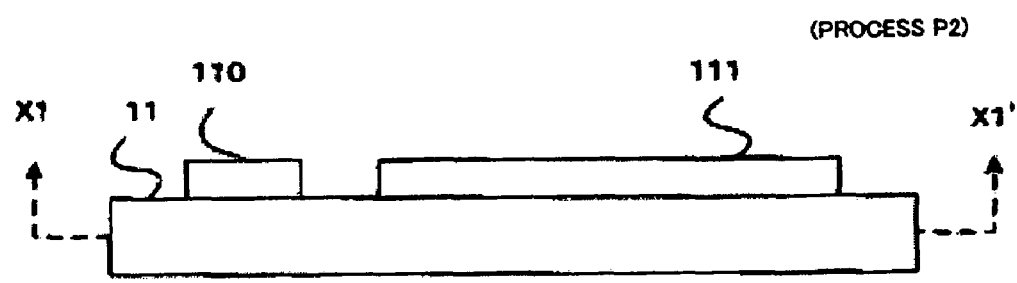
Figure 3C:
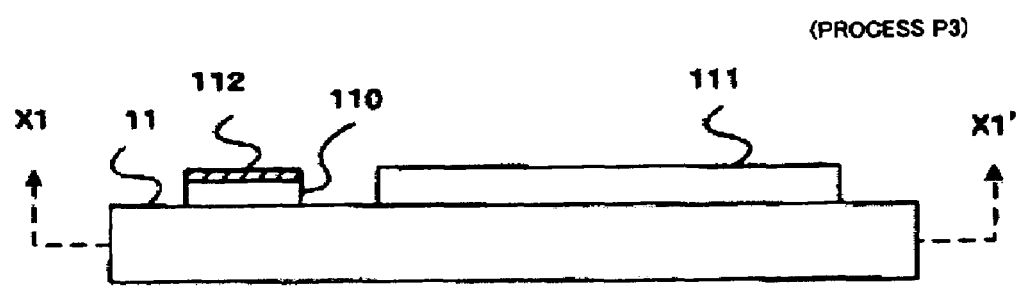
Figure 3D:
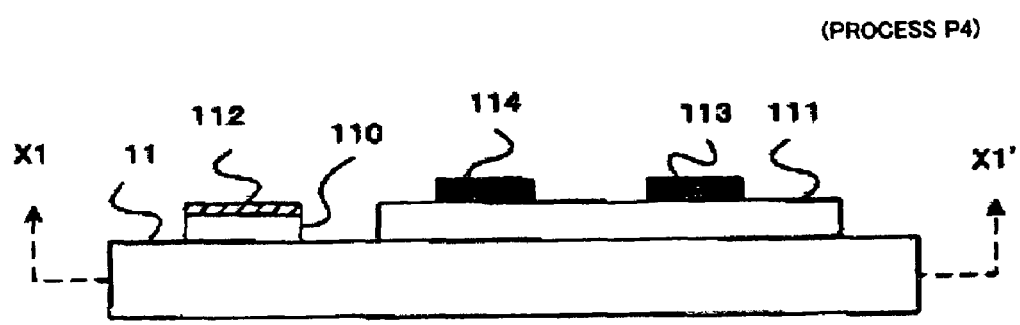

A first exemplary embodiment comprises an IPS mode electrode structure 1. FIG. 2 is a schematic plan view showing a manufacturing process of a portion of an electrode structure according to the first exemplary embodiment, and FIGS. 3A-D and 4A-D are schematic partial cross-sectional views thereof. Moreover, FIG. 2 shows an area corresponding to two pixels vertically disposed. FIG. 3 is a schematic cross-sectional view taken along line X1-X1' of FIG. 2, and FIG. 4 is a schematic cross-sectional view taken along line X2-X2' of FIG. 2.

According to a method of manufacturing the electrode structure 1, as shown in FIGS. 2 to 4, a signal electrode 110 made of tantalum (Ta) is formed on the transparent substrate 11 in a process P1. Specifically, tantalum is formed on the transparent substrate 11 made of glass by a sputtering process and then is shaped by a photolithography process as shown in FIGS. 2 to 4. Then, the shaped tantalum is oxidized by anode oxidization to form an oxide film ($TaO_x$) on a surface.

In a process P2, a portion of the signal electrode 110 is separated to form a TFD element 111. Next, in a process P3, the signal electrode 110 excluding the TFD element 111 is further oxidized to form an oxide film ($TaO_x$) as an insulating layer 112. In a process P4, as shown in FIGS. 2 to 4, a pixel electrode 114 is formed on the TFD element 111, and a common electrode 113 is formed on the TFD element 111 and the signal electrode 110. The pixel electrode 114 and the common electrode 113 are, for example, made of chromium (Cr). Specifically, for example, a chromium thin film is formed by a sputtering process, and a photolithography process is performed as shown in FIGS. 2 to 4, resulting in formation of a TFD element portion 115.

Figure 4A:
FIGS. 4A-4D are schematic cross-sectional views showing the manufacturing process of the electrode structure according to the first exemplary embodiment.
Figure 4B:
Figure 4C:
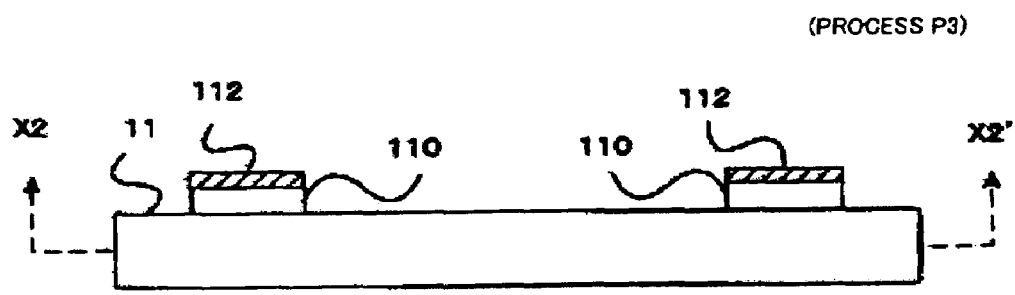
Figure 4D:
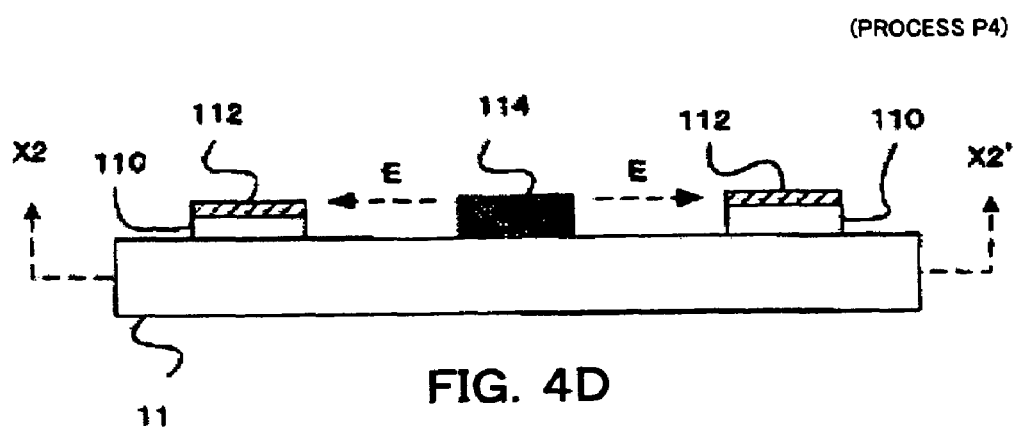

When a scanning voltage is applied to the signal electrode 110 and a driving voltage is applied to the common electrode 113, a transverse electric field E is generated between the pixel electrode 114 and the signal electrode 110 as shown in FIG. 4D. Alignment of liquid crystal molecules in a liquid crystal layer is controlled by the transverse electric field E.

In the present exemplary embodiment, as shown in FIG. 2, the signal electrode 110 and the pixel electrode 114 are formed nearly in the shape of 'left arrow' in each pixel area. It is intended to enhance or improve a viewing angle, and as seen from an upper side of FIG. 2 and as seen from a lower side thereof, have the same shape. However, this shape is not an essential configuration in the exemplary embodiments of the present invention. That is, the signal electrode 110 and the pixel electrode 114 may be formed in a vertically straight line in FIG. 2.

In such a manner, in the IPS mode electrode structure 1, forming a TFD element as a switching element can greatly reduce manufacturing processes as compared with forming a TFT element.

The pixel electrode 114 is surrounded in three directions except the common electrode 113 side by the signal electrode 110 in plan view, so that the pixel electrode 114 is electrically shielded by the common electrode 113. In such a manner, as described below, it is possible to reduce influence by a parasitic capacitor between adjacent pixel electrodes or signal electrodes, thereby reducing or preventing display irregularities or crosstalk phenomenon.

Second Exemplary Embodiment

Figure 5A:
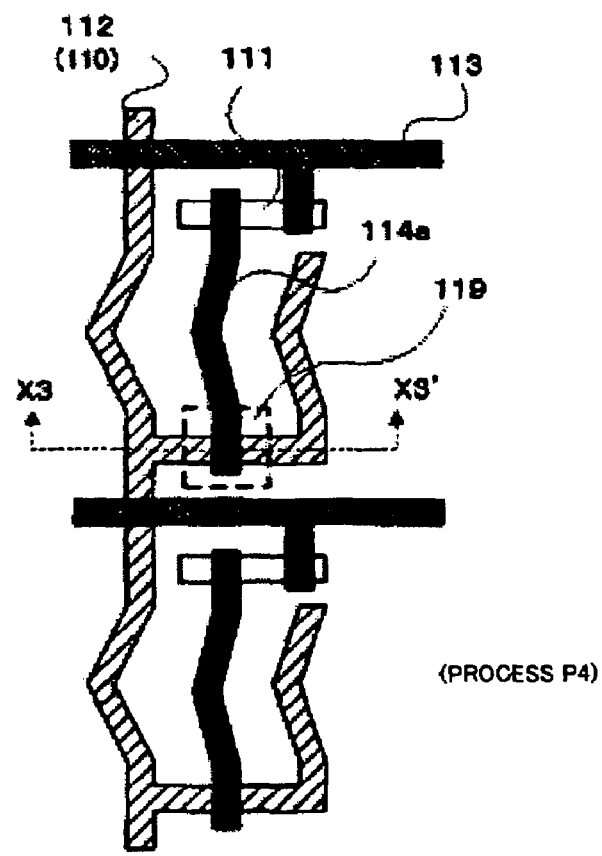
FIGS. 5A-5B are a schematic plan view and a schematic cross-sectional view showing a manufacturing process of an electrode structure according to a second exemplary embodiment.
Figure 5B:
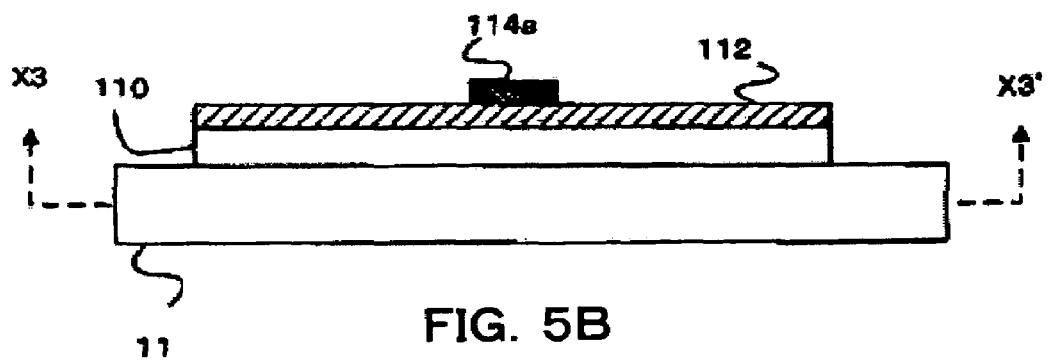

Next, a second exemplary embodiment will be now described. FIG. 5A is a schematic plan view showing an electrode structure 1 according to the second exemplary embodiment, and FIG. 5B is a schematic sectional view taken along line X3-X3' of FIG. 5A. As compared with FIG. 2, the electrode structure 1 of the second exemplary embodiment is fundamentally the same as that of the first exemplary embodiment. However, the second exemplary embodiment is different from the first exemplary embodiment in that a storage capacitor is formed by crossing the pixel electrode 114a and the signal electrode 110 in an area 119 indicated by a broken line.

Assuming that a capacitor of the TFD element portion 115 is CTFD and the storage capacitor of the area 119 is CPIX, it is possible to obtain a satisfactory contrast by setting the ratio of CPIX/CTFD to be about 6 through 12.

A specific manufacturing method is almost the same as the manufacturing method of the first exemplary embodiment described with reference to FIGS. 2 through 4. In a process P4, when a pixel electrode 114a is patterned by a photolithography process after forming chromium by a sputtering process, it is preferable that the pixel electrode 114a and the signal electrode 110 cross in the area 119.

Third Exemplary Embodiment

Figure 6A:
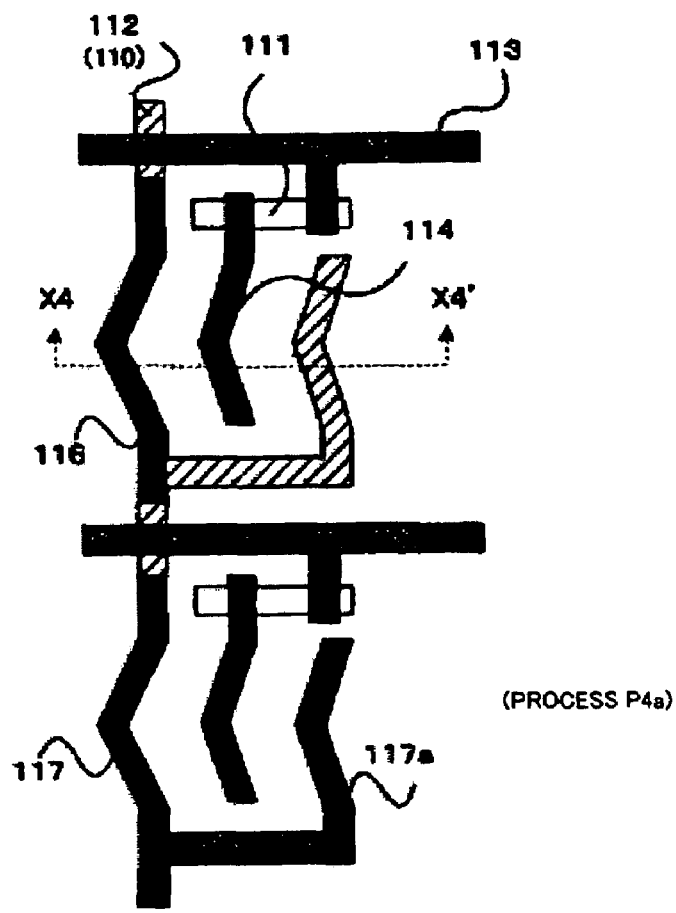
FIGS. 6A-6B are schematics that show an electrode structure according to a first exemplary example of a third exemplary embodiment.
Figure 6B:
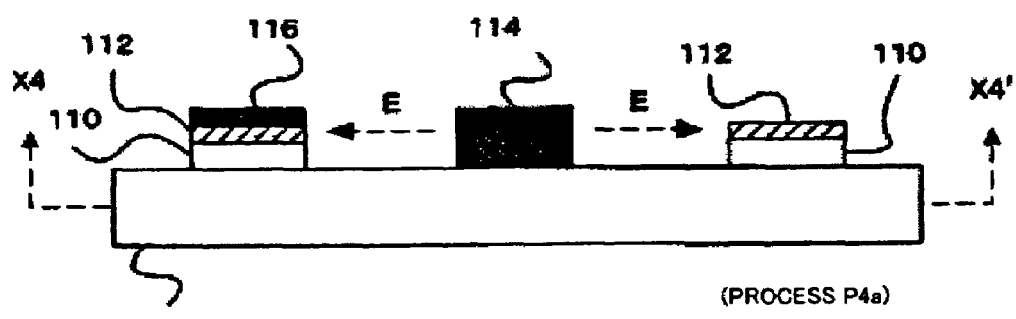

Next, a third exemplary embodiment will be now described. FIG. 6A is a schematic plan view showing the electrode structure 1 according to a first exemplary example of a third exemplary embodiment, and FIG. 6B is a schematic sectional view taken along line X4-X4' of FIG. 6A. The electrode structure 1 according to the first exemplary example of the third exemplary embodiment is fundamentally the same or similar as that of the first exemplary embodiment. However, in the third exemplary embodiment, as shown in FIG. 6A, a chromium electrode 116 or 117 is further formed on the signal electrode 110, thereby reducing resistance of the signal electrode 110. As described in the first exemplary embodiment, in a process P3, an oxide film is formed as an insulating layer 112 on a surface of the signal electrode 110 by anode-oxidizing the signal electrode 110. As a result, the signal electrode 110 decreases in film thickness by the oxide film 112, thereby increasing resistance. Thus, in the third exemplary embodiment, by additionally forming the chromium electrode 116 or 117 on the signal electrode 110, the resistance of the signal electrode 110 is made to be reduced.

The chromium electrode 116 is formed only on a portion of the signal electrode 110, and the chromium electrode 117 is formed on almost the entire area (an area where the pixel electrode is interposed) of the signal electrode 110. Actually, on the entire area of the electrode structure 1, either the electrode 116 or the electrode 117 may be formed, or both of them may be formed.

As shown in FIG. 6B, in an area where the electrode 116 or 117 is formed, the insulating layer 112 made of tantalum oxide is formed on the tantalum signal electrode 110, and the chromium electrode 116 or 117 is formed thereon. Thus, it is possible to reduce resistance in the signal electrode portion by forming the chromium electrode 116 or 117 on the signal electrode 110. In addition, the chromium electrode 116 or 117 can be formed together in a process P4 of forming the chromium pixel electrode 114 and the common electrode 113 in the first exemplary embodiment. In other words, after forming chromium by a sputtering process in a process P4a, the pixel electrode 114, the common electrode 113 and the electrode 116 or 117 may be patterned by a photolithography process. Since a new process needs not to be added in order to form the chromium electrode 116 (or 117), it is possible to reduce the resistance of the signal electrode 110 without increasing the number of processes.

As shown in FIG. 6B, in the above-mentioned exemplary embodiment, the insulating layer 112 made of tantalum oxide is interposed between the tantalum signal electrode 110 and the chromium electrode 116. Therefore, it is possible to reduce resistance in a high frequency component of a driving voltage applied to the signal electrode 110 since the signal electrode 110 and the chromium electrode 116 form a short-circuit at a high frequency, but it may be difficult to sufficiently decrease the resistance in a low frequency component and a direct current component since the insulating layer 112 made of tantalum oxide is interposed.

Figure 7A:
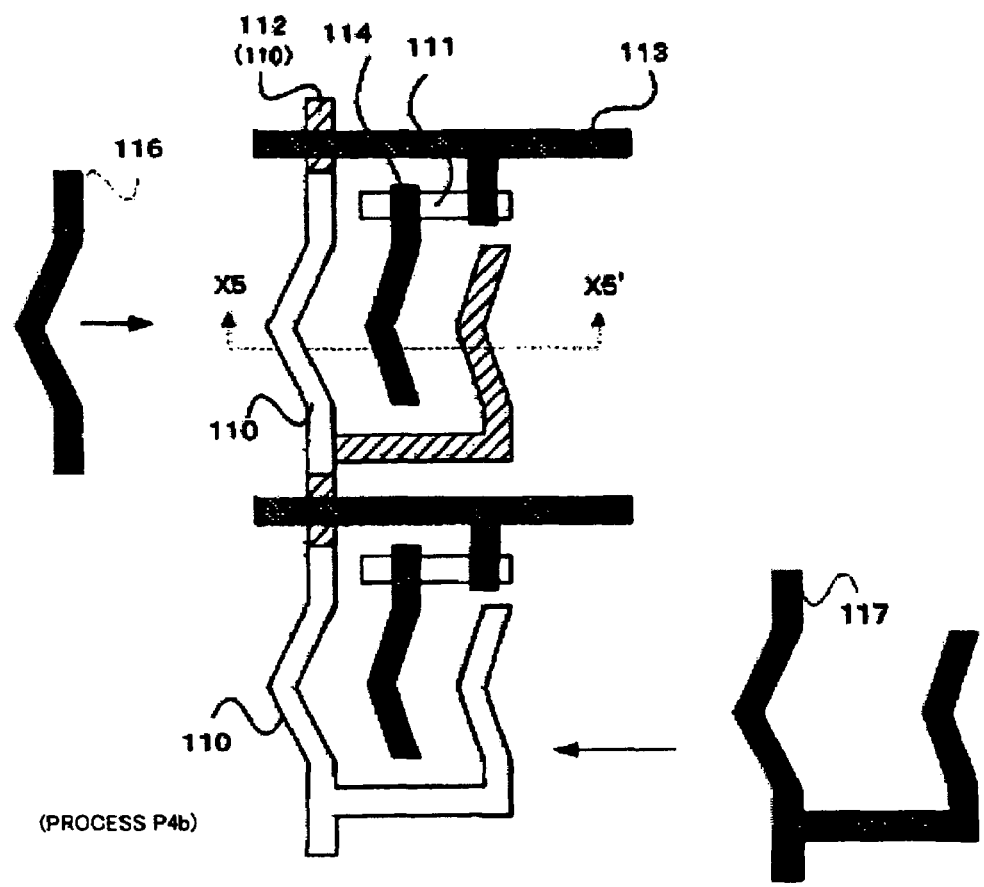
FIGS. 7A-7B are schematics that show an electrode structure according to a second exemplary example of the third exemplary embodiment.
Figure 7B:
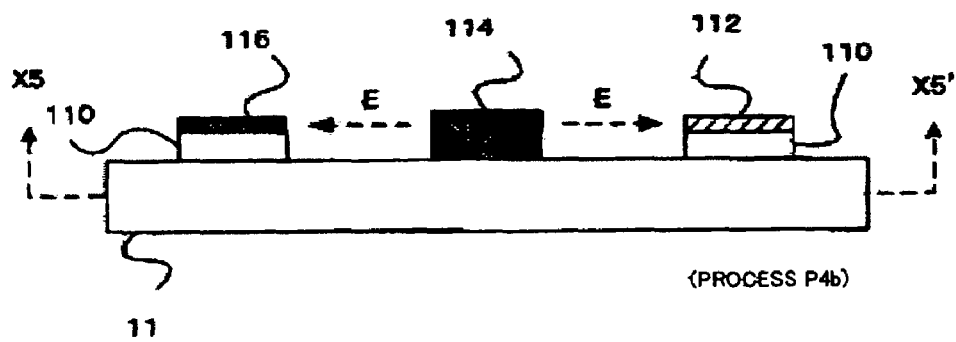

Therefore, in the following third exemplary embodiment, as shown in FIG. 7, in an area where the chromium electrode 116 is formed, the insulating layer 112 made of tantalum oxide on the signal electrode 110 is removed and the chromium electrode 116 is directly formed on the signal electrode 110. In such a manner, as shown in FIG. 7B, in the signal electrode 110 portion, the chromium electrode 116 is formed on the tantalum signal electrode 110 with no insulating layer interposed therebetween. Therefore, it is possible to reduce the resistance even in a low frequency component and a direct current component as well as a high frequency component.

In this case, the manufacturing method is the same or similar as the method of the second exemplary embodiment until a process P3. Preferably, in a process P4b, after the insulating layer 112 is formed in a process P3, the insulating layer 112 in an area of the chromium electrode 116 is removed and the chromium electrode 116 is formed thereon. The pixel electrode 114 and the common electrode 113 are also formed in the same process P4b.

In addition, the same processes are applied to the chromium electrode 117. In order to reduce the resistance of the signal electrode 110, a base electrode made of chromium may be formed below the tantalum signal electrode 110 before the process P1.

In the third exemplary embodiment, in a manufacturing process of the pixel electrode 114 and the common electrode 113, it is possible to reduce the resistance of the signal electrode 110 by additionally forming the electrode 116 or 117 on the signal electrode 110.

In addition, it is possible to secure the storage capacitor by simultaneously applying the second exemplary embodiment to the present exemplary embodiment.

Fourth Exemplary Embodiment

Figure 8:
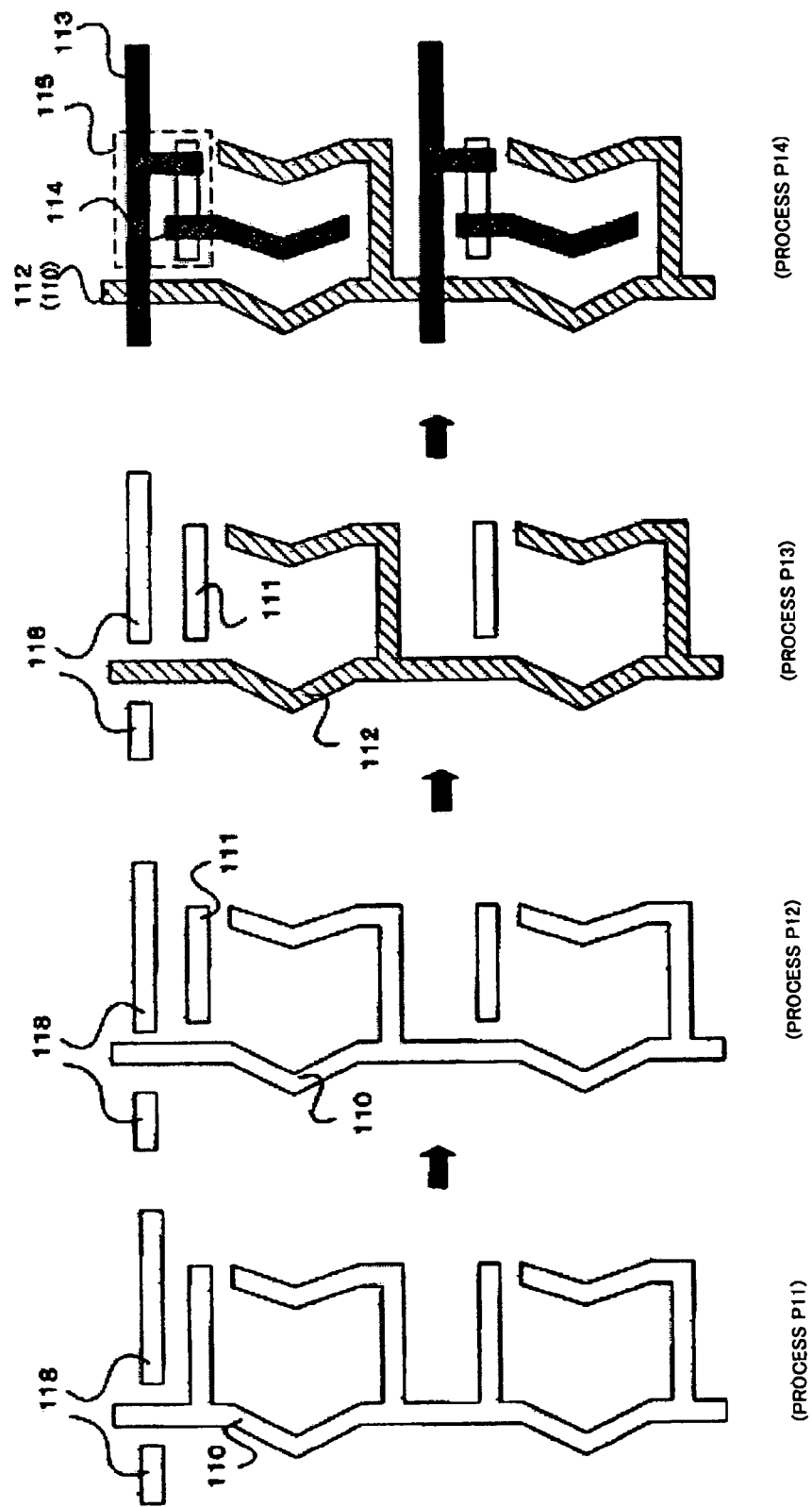
FIG. 8 is a schematic plan view showing a manufacturing process of an electrode structure according to a fourth exemplary embodiment.

Next, a fourth exemplary embodiment will be described. While the third exemplary embodiment is intended to reduce the resistance of the signal electrode 110, the fourth exemplary embodiment is intended to reduce the resistance of the common electrode 113. FIG. 8 is a schematic plan view showing a manufacturing process of an electrode structure according to the fourth exemplary embodiment. As compared with FIG. 2, in the fourth exemplary embodiment, a tantalum base electrode 118 is formed in advance on an area where the common electrode 113 is formed. In such a manner, the common electrode 113 portion is formed in such a layer structure that the chromium common electrode 113 is formed on the tantalum base electrode 118. This structure is the same or similar as the example shown in FIG. 7 of the third exemplary embodiment, with no insulating layer interposed therebetween. Therefore, it is possible to reduce the resistance in a direct current component through a high frequency component.

A manufacturing process is fundamentally the same as the process of the first exemplary embodiment except for forming the tantalum base electrode 118. As shown in FIG. 8, the tantalum signal electrode 110 and the base electrode 118 are formed in a process P11. Next, the TFD element 111 is formed by separating a portion of the signal electrode 110 in a process P12, and the insulating layer 112 made of tantalum oxide is formed on the signal electrode 110 by an anode oxidization process in a process P13. The chromium pixel electrode 114 and the common electrode 113 are formed in a process P14. At this time, since the common electrode 113 is formed on the base electrode 118 formed in a process P11, it is possible to reduce the resistance in the common electrode portion.

In a process P11, when the anode oxidization process is performed after forming the tantalum signal electrode 110, the insulating layer 112 made of tantalum oxide is interposed between the tantalum base electrode 118 and the chromium common electrode 113, similarly to FIG. 6 of the third exemplary embodiment. Therefore, the effect of the resistance reduction is expected to be decreased in direct current and low frequency components. Meanwhile, in a process P11, if the signal electrode 110 and the base electrode 118 are not subjected to the anode oxidization process, the insulating layer 112 made of tantalum oxide is not interposed between the base electrode 118 and the common electrode 113. Therefore, it is possible to reduce the resistance in a direct current component through a high frequency component.

In addition, the reduction of resistance in the common electrode according to the fourth exemplary embodiment can be preformed simultaneously with the reduction of resistance in the signal electrode according to the third exemplary embodiment. In addition, it is possible to secure the storage capacitor by simultaneously applying the second exemplary embodiment to the present exemplary embodiment.

Fifth Exemplary Embodiment

Next, a fifth exemplary embodiment will be described. In the above-mentioned first through fourth exemplary embodiments, the insulating layer 112 made of tantalum oxide is formed by anode oxidizing the tantalum signal electrode 110 in order to insulate the signal electrode 110 and the common electrode 113. Meanwhile, in the fifth exemplary embodiment, the signal electrode 110 and the common electrode 113 are insulated by forming an insulating layer made of resin such as acryl on the signal electrode 110 instead of forming the insulating layer 112 made of tantalum oxide.

Figure 9:
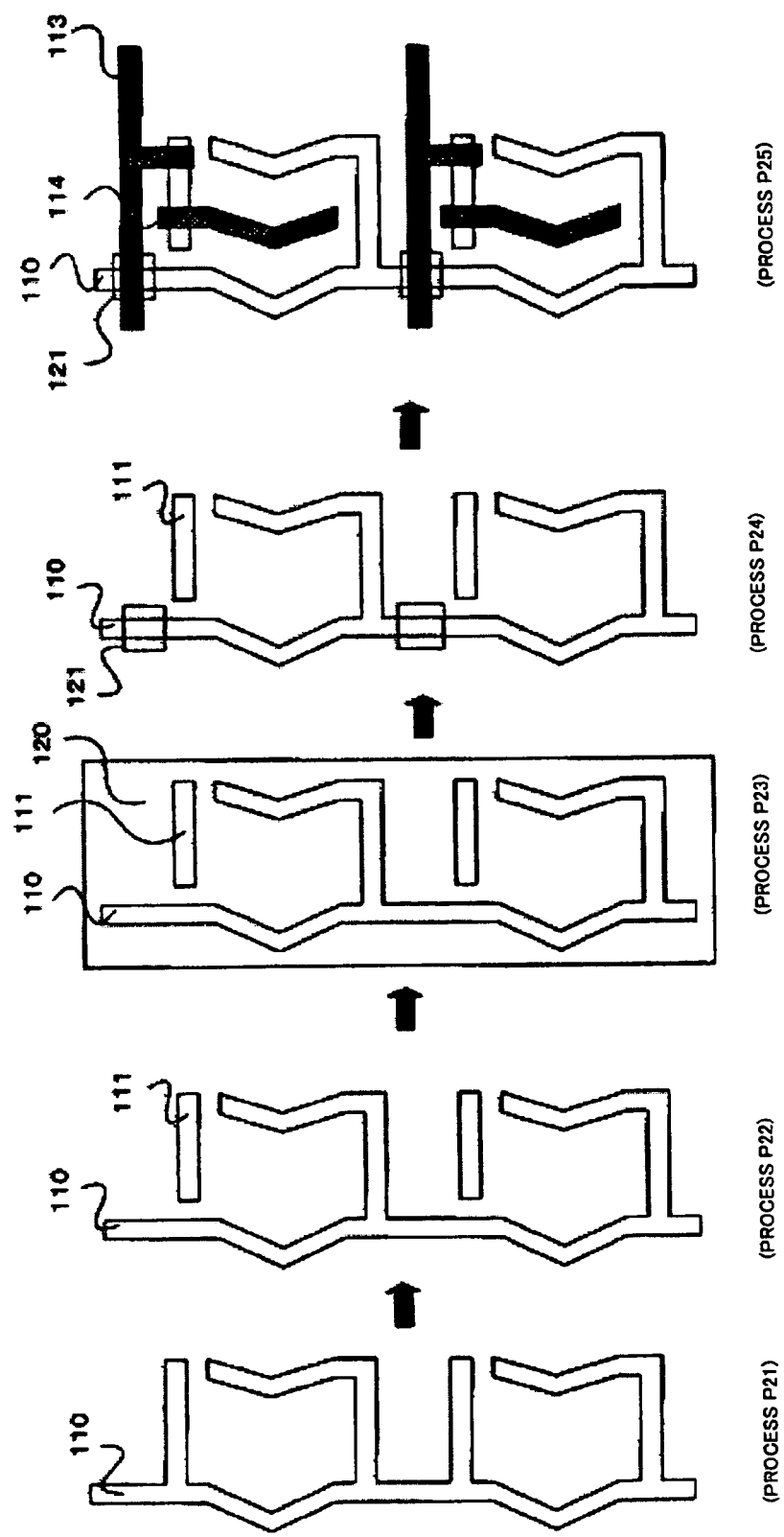
FIG. 9 is a schematic plan view showing a manufacturing process of an electrode structure according to a first exemplary example of a fifth exemplary embodiment.

FIG. 9 is a schematic plan view showing a manufacturing process of the electrode structure according to a first exemplary example of a fifth exemplary embodiment. First, the tantalum signal electrode 110 is formed and oxidized on the transparent substrate 11 made of glass in a process P21, and the TFD element 111 is formed by separating a portion thereof in a process P22. The above-mentioned processes are the same as the processes P1 and P2 in the first exemplary embodiment.

Next, in a process P23, an insulating layer 120 made of transparent resin such as acryl is formed so as to cover the signal electrode 110. This process can be performed, for example, by applying the acryl resin on the signal electrode 110. In a process P24, the insulating layer 120 is removed in an area excluding an area 121 where the signal electrode 110 and the common electrode 113 cross. As a result, as shown in FIG. 9, the resin insulating layer remains only in the area 121 where the signal electrode 110 and the common electrode 113 cross.

Similarly to the first exemplary embodiment, the pixel electrode 114 and the common electrode 113, which are made of chromium, are formed in a process P25. In the area 121, the common electrode 113 is formed on the resin insulating layer formed in processes P23 and P24. Therefore, the signal electrode 110 and the common electrode 113 are electrically insulated by the resin insulating layer interposed therebetween.

Next, a second example of the fifth exemplary embodiment will be described. In the first example shown in FIG. 9, after the insulating layer 120 made of acryl is formed to cover the entire signal electrode in a process P23, the insulating layer 120 remains only in the area 121 where the signal electrode 110 and the common electrode 113 cross and the insulating layer 120 in other areas is removed in a process P24. As a result, the resin insulating layer remains only in the area 121 where the signal electrode 110 and the common electrode 113 cross. Meanwhile, in the second example shown in FIG. 10, the resin insulating layer is removed only in an area 123 where the common electrode 113 and the TFD element 111 are in contact with each other. Therefore, the resin insulating layer remains in other areas including the area 121 where the signal electrode 110 and the common electrode 113 cross.

Basically, the signal electrode 110 and the common electrode 113 are insulated from each other in an area where the two electrodes 110 and 113 cross, and the pixel electrode 114 and the common electrode 113 are electrically contact with the TFD element 111. Therefore, in the example of FIG. 9, the resin insulating layer remains only in the area where the signal electrode 110 and the common electrode 113 cross, and the resin insulating layer is removed in the area of the TFD element 111. Meanwhile, in the example of FIG. 10, the resin insulating layer remains in the entire area including the area where the signal electrode 110 and the common electrode 113 cross, and the resin insulating layer is removed only in the area 123 of the TFD element 111. Thus, the TFD element 111 can electrically contact with the pixel electrode 114 and the common electrode 113.

Figure 10:
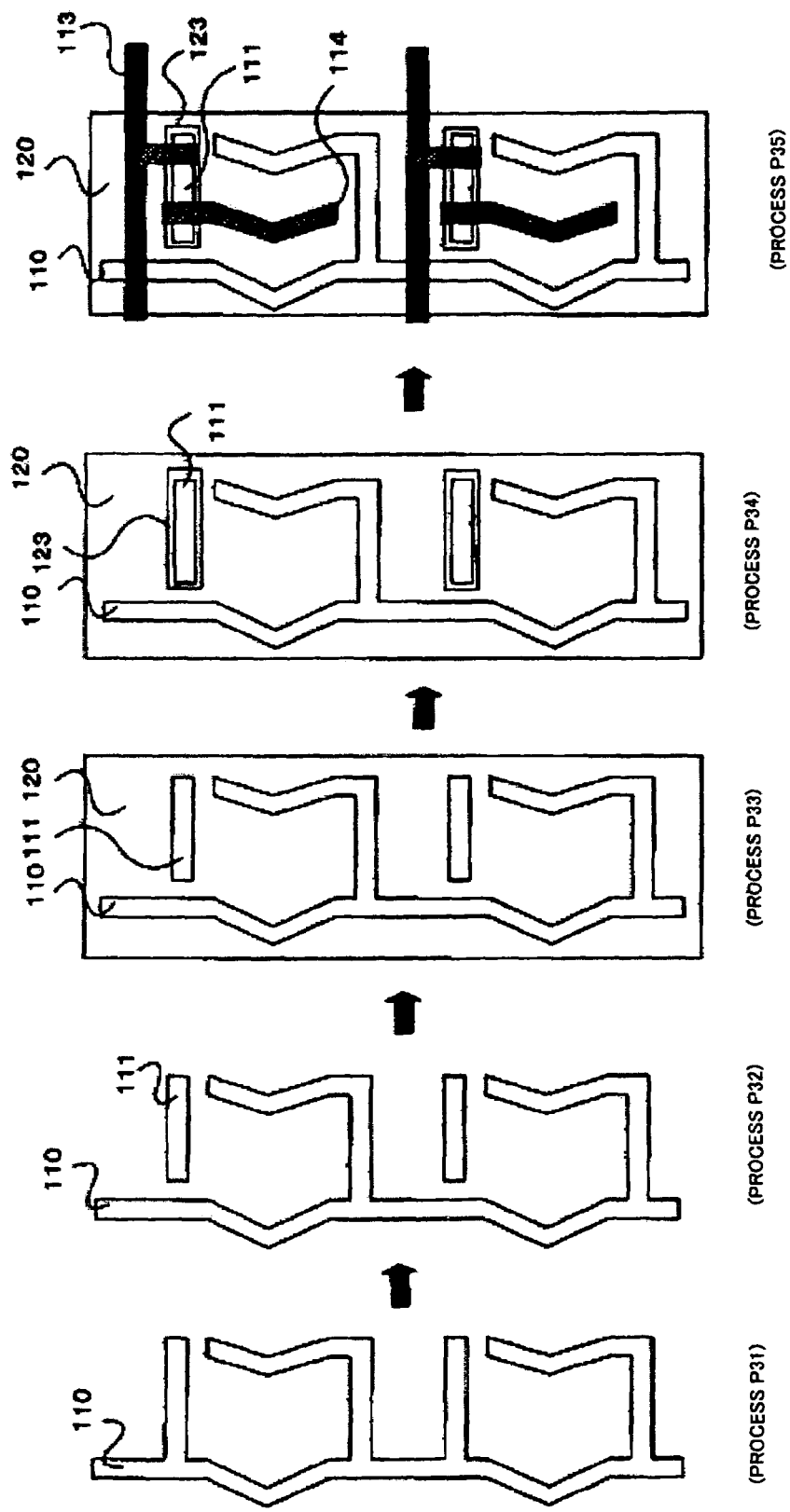
FIG. 10 is a schematic plan view showing a manufacturing process of an electrode structure according to a second exemplary example of the fifth exemplary embodiment.

FIG. 10 is a schematic plan view showing a manufacturing process of an electrode structure according to the second exemplary example. First, the signal electrode 110 is formed and oxidized in a process P31, and a portion of the signal electrode 110 is separated to form the TFD element 111 in a process P32. The insulating layer 120 made of a transparent resin such as acryl is formed so as to cover the signal electrode 110 and the TFD element 111. The above-mentioned processes are the same as the processes P21 through P23 in the example shown in FIG. 9.

Next, the acryl insulating layer 120 is removed only in the area 123 of the TFD element 111 in a process P34. The chromium pixel electrode 114 and the common electrode 113 are formed on the insulating layer 120. Since the resin insulating layer is removed in the area 123 of the TFD element 111 in a process P34, the TFD element 111 can electrically contact with the pixel electrode 114 and the common electrode 113.

Since the acryl insulating layer remains in an area other than the area 123 of the TFD element 111, the acryl insulating layer is interposed between the signal electrode 110 and the common electrode 113. Therefore, the signal electrode 110 and the common electrode 113 are insulated from each other.

In addition, it is possible to secure the storage capacitor by simultaneously applying the second exemplary embodiment to the present exemplary embodiment.

Figure 11:
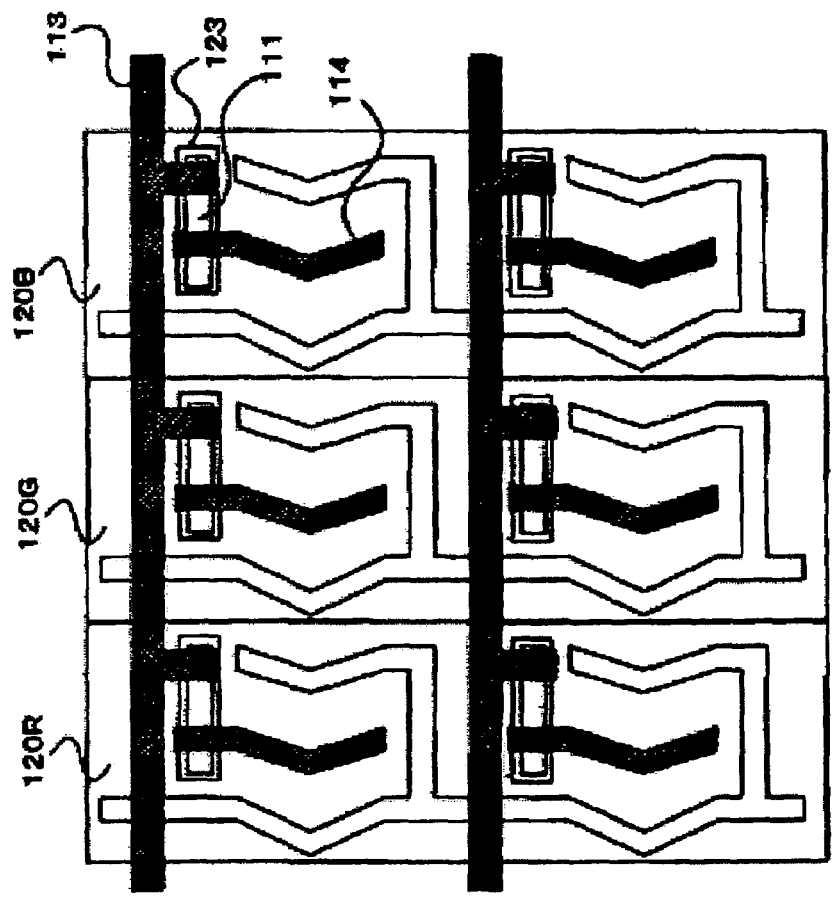
FIG. 11 is a schematic plan view showing an application example of the fifth exemplary embodiment.

FIG. 11 shows an application example of the fifth exemplary embodiment. While the acryl insulating layer 120 remains in an area excluding the area 123 of the TFD element 111 in the example shown in FIG. 10, the acryl insulating layer 120 is used as a color filter layer in the application example shown in FIG. 11. FIG. 11 shows an electrode structure corresponding to two pixels consisting of RGB sub-pixels in a vertical direction. An electrode structure of each of the sub-pixels is the same as the electrode structure shown in FIG. 10. An acryl insulating layer is used as a color filter corresponding to each of the RGB sub-pixels in an area excluding the area 123 of the TFD element 111. From the left of FIG. 11, an acryl insulating layer 120R used as a red color filter, an acryl insulating layer 120G used as a green color filter, and an acryl insulating layer 120B used as a blue color filter are provided, respectively. These three sub-pixels constitute a single color pixel.

The acryl insulating layers 120R through 120B used as color filters can be formed, for example, by applying acryl resin, into which pigment of each color is dispersed, and performing exposure, development, and etching processes. Thus, the color filter layer 22 on the upper substrate 20 shown in FIG. 1 is not required by using the acryl insulating layer as the color filter layer, thereby simplifying the manufacturing process.

Sixth Exemplary Embodiment

Figure 12:
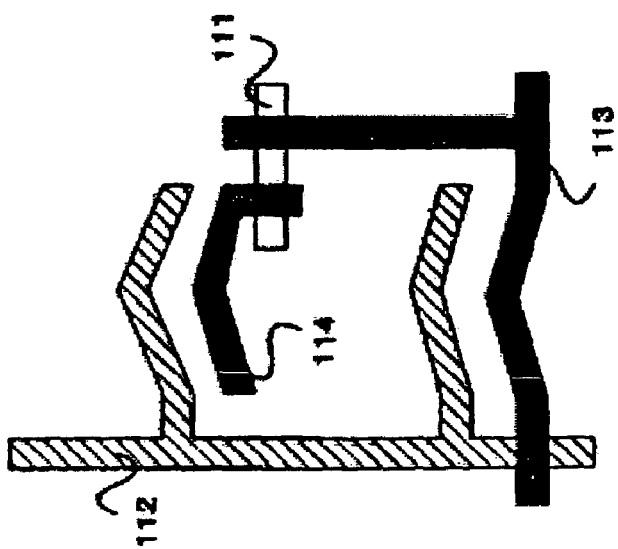
FIG. 12 is a schematic plan view showing an electrode structure according a sixth exemplary embodiment.

Next, a sixth exemplary embodiment will be described. The sixth exemplary embodiment relates to modifying the shape of each electrode in the electrode structure 1. FIG. 12 shows an example of the electrode structure 1 according to the sixth exemplary embodiment. While the signal electrode 110 and the pixel electrode 114 are formed almost in the shape of 'left arrow' in the first through fifth exemplary embodiments, the signal electrode 110 and the pixel electrode 114 are formed almost in the shape of 'left upward arrow' in the sixth exemplary embodiment shown in FIG. 12.

The manufacturing method of the electrode is basically the same as the method of the first exemplary embodiment. First, the tantalum signal electrode 110 is formed on the transparent substrate 11 such as a glass substrate, and, if necessary, is anode-oxidized. Then, a portion of the electrode 110 is separated to form the TFD element 111. Then, the signal electrode 110 is anode-oxidized to form the insulating layer 112 made of tantalum oxide on the signal electrode 110, and to form the pixel electrode 114 and the common electrode 113, which are made of chromium.

The above-mentioned second through fifth exemplary embodiments can be also applied to the electrode structure according to the present exemplary embodiment, similarly to the first exemplary embodiment.

Seventh Exemplary Embodiment

Next, a seventh exemplary embodiment will be described. The seventh exemplary embodiment relates to an application of arrangement of each electrode in the electrode structure 1. While the signal electrodes are formed on both sides of the pixel electrode to generate a transverse electric field in the above-mentioned first through sixth exemplary embodiments, the TFD element and the pixel electrode are almost symmetrically formed on both sides of a single signal electrode in the seventh exemplary embodiment, thereby forming a single pixel (a single sub-pixel).

Figure 13:
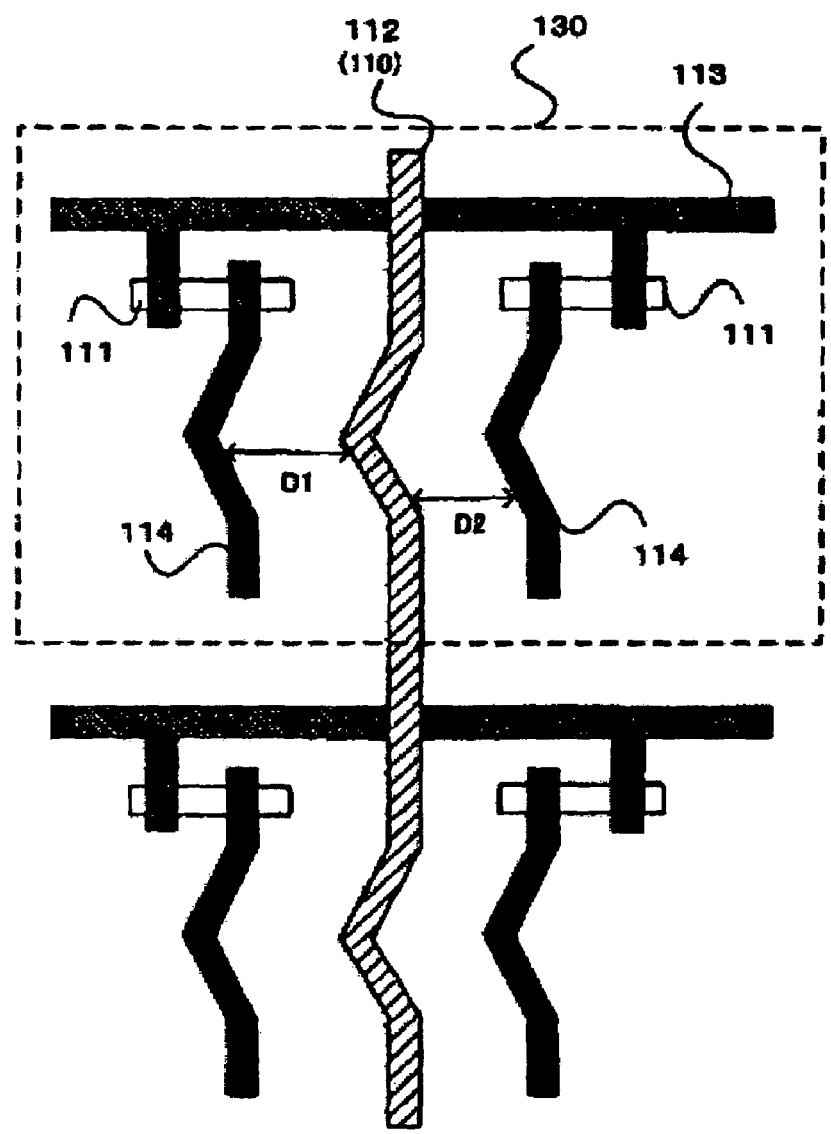
FIG. 13 is a schematic plan view showing an electrode structure according to a first exemplary example of a seventh exemplary embodiment.

FIG. 13 shows a first example of the electrode structure according to the seventh exemplary embodiment. The TFD element 111 is formed on both sides of a single signal electrode 110 covered with the insulating layer 112, and a pair of pixel electrodes 114 are formed to electrically contact with the TFD element 111. The common electrode 113 is formed to be almost orthogonal to the signal electrode 110. An area 130 including a single signal electrode 110 and a pair of pixel electrodes 114 constitute a single sub-pixel. In this electrode structure, for example, as compared with the electrode structure of the first exemplary embodiment shown in FIG. 2, it is possible to enhance or improve aperture ratio per sub-pixel since a pair of pixel electrodes 114 share a single signal electrode 110. In addition, since a pair of the TFD element 111 and the pixel electrode 114 constitute a single sub-pixel, it is possible to reduce or prevent the sub-pixel itself from failing to display even when one TFD element 111 fails to work, as long as the other TFD element 111 works properly.

In addition, it is possible to enhance or improve the viewing angle by differently setting distances between the signal electrode 110 and each of the pixel electrodes 114 provided on both sides of the signal electrode 110, that is, electrode gaps D, within a single sub-pixel. Specifically, as shown in FIG. 13, assuming that D1 denotes an electrode gap between the signal electrode 110 and the left pixel electrode 114 and D2 denotes an electrode gap between the signal electrode 110 and the right pixel electrode 114, D1 is set to be different from D2. In such a manner, the transverse electric field intensities between the signal electrode 110 and each of the pixel electrodes 114 on both sides of the signal electrode 110 can be different from each other. Therefore, it is possible to make a driving characteristic (which represents a relation between a driving voltage applied to liquid crystal and a transmittance ratio of a liquid crystal layer) different from each other in the left and right areas of a single sub-pixel 130. Therefore, it is possible to obtain a predetermined transmittance ratio from the entire sub-pixel despite a change in the driving voltage, by appropriately setting the electrode gaps D1 and D2 to adjust the driving characteristic, thereby improving viewing angle. In addition, it is possible to make different the driving characteristics of both sides of the single sub-pixel 130 by adjusting the electrode gaps D1 and D2, whereby one side may be determined to be a transmissive area and the other side may be determined to be a reflective area.

Figure 14:
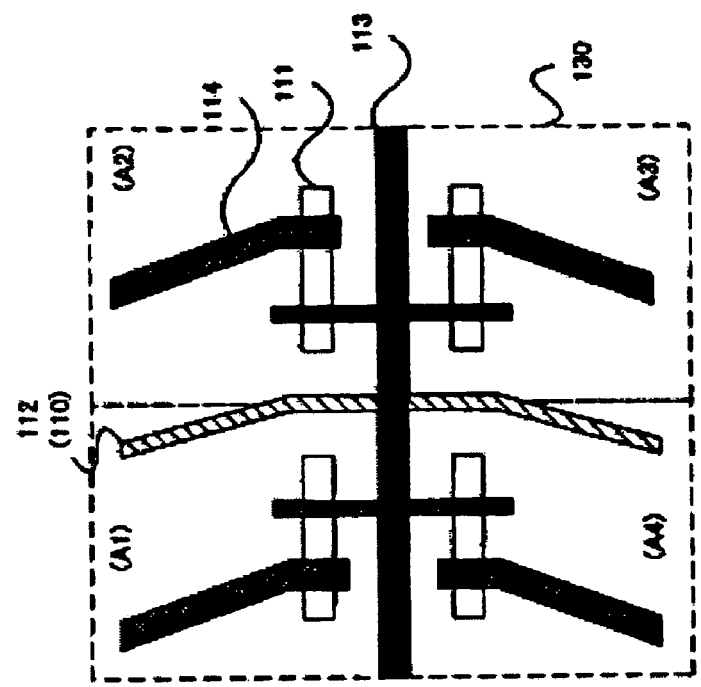
FIG. 14 is a schematic plan view showing an electrode structure according to a second exemplary example of the seventh exemplary embodiment.

FIG. 14 shows a second example of the electrode structure according to the seventh exemplary embodiment. In the second example, the TFD element 111 and the pixel electrode 114 are formed on each of four areas divided by the signal electrode 110 and the common electrode 113 which are provided almost to be orthogonal. The four areas constitute a single sub-pixel. In such a manner, although the TFD element 111 fails to work in three of four areas, it is possible to display by using the remaining area. In addition, similarly to the first example, it is possible to use each area as a transmissive or reflective area by making the electrode gaps in the areas different from each other, thereby enhancing or improving viewing angle.

Figure 15:
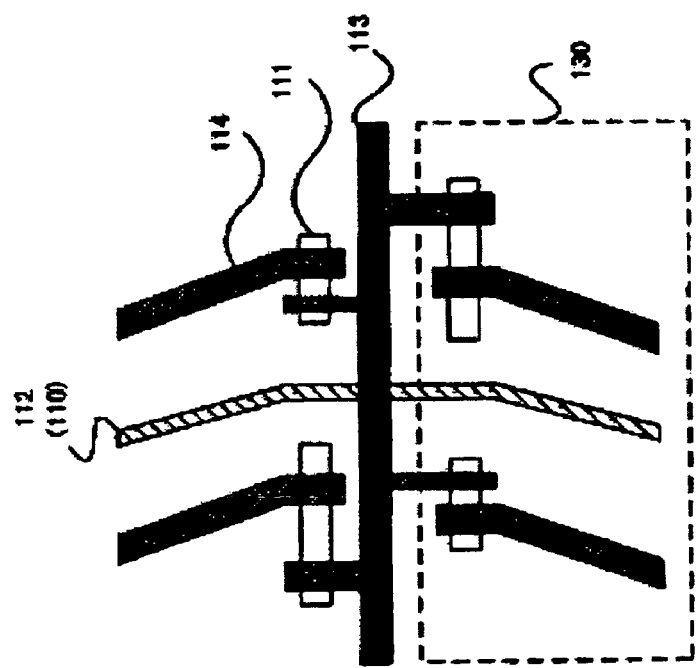
FIG. 15 is a schematic plan view showing an electrode structure according to a third exemplary example of the seventh exemplary embodiment.

FIG. 15 shows a third example of the electrode structure according to the seventh exemplary embodiment. In this example, similarly to the second example shown in FIG. 14, the TFD element 111 and the pixel electrode 114 are formed on each of four areas divided by the signal electrode 110 and the common electrode 113 which are provided almost to be orthogonal. In addition, the TFD element 111 in each area has a different size in the third example of FIG. 15. If the TFD elements 111 have a different size, the TFD elements as a switching element have different driving characteristics. Therefore, it is possible to make different a characteristic of transmittance ratio of a liquid crystal layer to an applied driving voltage for each area. Therefore, similarly to the adjustment of the above-mentioned electrode gap D, it is possible to enhance or improve the viewing angle of the entire sub-pixel by using each area as a transmissive or reflective area, or by realizing a different characteristic in each area.

Eighth Exemplary Embodiment

Next, an eighth exemplary embodiment will be described. While the above-mentioned first through seventh exemplary embodiments employ an IPS mode as a transverse electric field mode, the eighth exemplary embodiment employs an FFS mode. As described above, in the IPS mode, alignment of liquid crystal molecules is controlled by a transverse electric field resulting from conduction of between a line-shaped signal electrode and a line-shaped pixel electrode on the transparent substrate 11 made of glass. Meanwhile, the FFS mode generates a transverse electric field between a signal electrode layer on a transparent substrate and a line-shaped pixel electrode on the signal electrode layer with an insulating layer interposed therebetween in a display area of a pixel area except the TFD element portion.

Figure 16A:
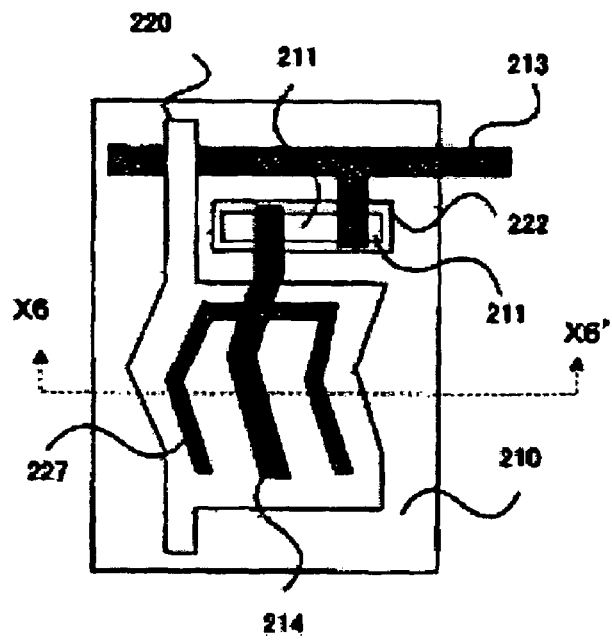
FIGS. 16A and B are a schematic plan view and a schematic cross-sectional view showing an electrode structure according to a first exemplary example of an eighth exemplary embodiment.
Figure 16B:
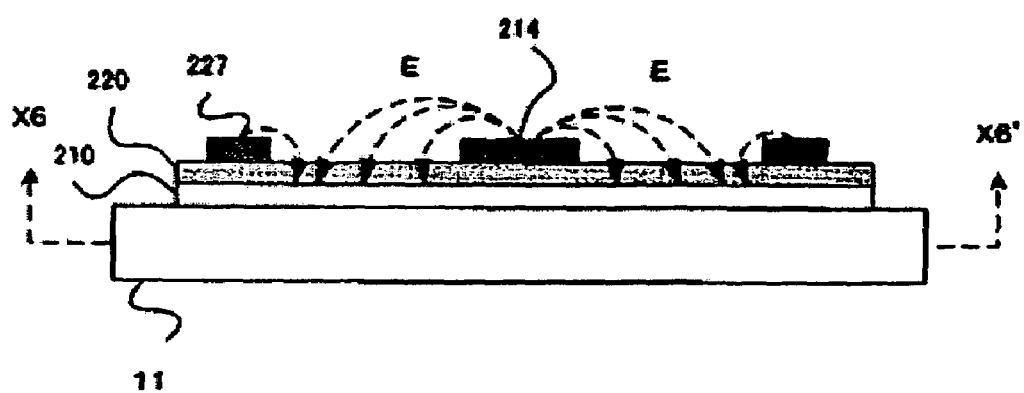

FIGS. 16A and B show an electrode structure according to a first exemplary example of the eighth exemplary embodiment. FIG. 16A is a schematic plan view of the electrode structure, and FIG. 16B is a schematic sectional view taken along line X6-X6' of FIG. 16A. A signal electrode 210 is formed on the transparent substrate 11 over a range corresponding to a display area, and a portion of the signal electrode 210 is separated to form a TFD element 211. Next, an insulating layer 220 is formed on the signal electrode 210, the insulating layer 220 is removed only in an area 222 of the TFD element 211, and a pixel electrode 214 and a common electrode 213, which are made of chromium, are formed on the insulating layer 220. If necessary, a plurality of auxiliary pixel electrodes 227 can be formed, in addition to the pixel electrode 214. The signal electrode 210 and the common electrode 213 are insulated from each other by the insulating layer 220. Since the insulating layer 220 is removed in the area 222 of the TFD element 111, the TFD element 111 can electrically contact with the pixel electrode 214 and the common electrode 213.

Thus, as shown in FIG. 16B, the pixel electrodes 214 and 227 are disposed on the signal electrode 210 with the insulating layer 220 interposed therebetween, whereby a transverse electric field E is generated between the pixel electrode and the signal electrode. The alignment of liquid crystal molecules is controlled by the electric field E. The signal electrode 210 can be formed of a transparent electrode made of ITO (Indium Tin Oxide) for transmissive display. Instead of making the entire signal electrode 210 of ITO, only the circumference of the signal electrode 210 may be formed of tantalum and the ITO electrode may be formed on the inner area (a central portion of the pixel area corresponding to a display area). In addition, the insulating layer 220 is preferably made of a transparent resin such as acryl resin.

Figure 17A:
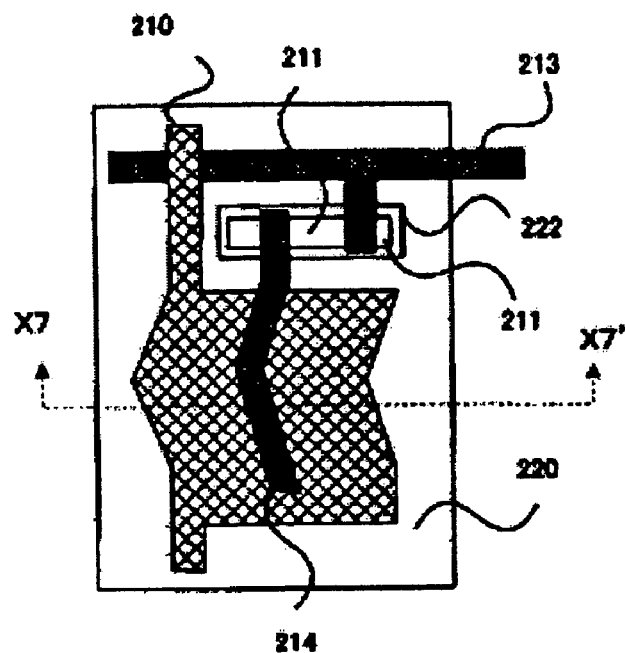
FIGS. 17A and B are a schematic plan view and a schematic cross-sectional view showing an electrode structure according to a second exemplary example of the eighth exemplary embodiment.
Figure 17B:
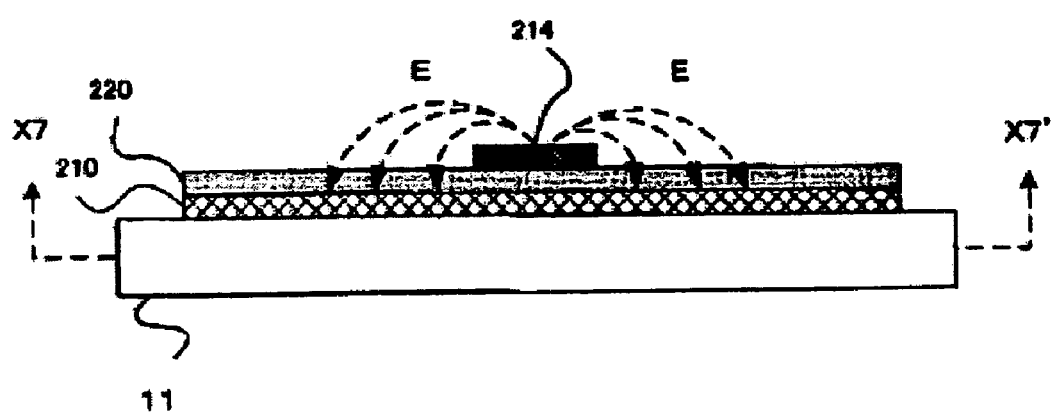

FIGS. 17A and B show an electrode structure according to a second exemplary example of the eighth exemplary embodiment. FIG. 17A is a schematic plan view of the electrode structure, and FIG. 17B is a schematic sectional view taken along line X7-X7' of FIG. 17A. As shown in FIG. 17, in a second example, the signal electrode 210 is made of reflective material such as aluminum, thereby performing reflective display. In addition, instead of making the entire signal electrode 210 of reflective material such as aluminum, only the circumference of the signal electrode 210 may be made of tantalum and an electrode made of reflective material such as aluminum may be formed on the inner area (a central portion of the pixel area corresponding to a display area).

Ninth Exemplary Embodiment

Next, a ninth exemplary embodiment will be described. The ninth exemplary embodiment relates to a method of simultaneously forming transmissive and reflective areas within a single pixel (sub-pixel) area in the FFS mode electrode structure described in the eighth exemplary embodiment. FIG. 18A shows an example of the FFS mode electrode structure having transmissive and reflective areas within a single pixel (sub-pixel). A signal electrode 210a is a transparent electrode made of ITO, and constitutes the transmissive area. A signal electrode 210b is a reflective electrode made of aluminum, and constitutes the reflective area. A transparent insulating layer 220 is formed on the signal electrodes 210a and 210b. In an area 222 of the TFD element 211, the transparent insulating layer 220 is removed and the TFD element 211 electrically contacts with the pixel electrode 214 and the common electrode 213, thereby forming the TFD element as a switching element. In such a manner, transflective display is made possible.

In FIG. 18B, the transmissive area and the reflective area are reversed in position. A signal electrode 210c is a reflective electrode made of aluminum, and a signal electrode 210d is a transparent electrode made of ITO. In such a manner, transflective display is made possible by forming the transparent electrode made of ITO and the reflective electrode made of aluminum, which constitute the signal electrode, within the same pixel.

Tenth Exemplary Embodiment

Next, a tenth exemplary embodiment will be described. While the transmissive and reflective areas are formed within a single pixel in the FFS mode electrode structure in the ninth exemplary embodiment, the transmissive and reflective areas are formed within a single pixel in the IPS mode electrode structure in the tenth exemplary embodiment.

FIG. 19 is a schematic plan view showing an electrode structure according to the tenth exemplary embodiment. A signal electrode 310 made of tantalum is formed on the transparent substrate 11 such as a glass substrate, and a reflective layer 341 is formed on a portion of an area surrounded by the signal electrode 310 (a lower half of the display area in an example of FIG. 19). The reflective layer 341 is made of insulating material, or is formed to be insulated from the signal electrode 310. A transparent insulating layer 320 made of acryl resin is formed on the signal electrode 310 and the reflective layer 341, the transparent insulating layer 320 is removed only in the area 322 corresponding to the TFD element 311, and a pixel electrode 314 and a common electrode 313, which are made of chromium, are formed. In such a manner, an area having the reflective layer 341 functions as a reflective area, and an area not having the reflective layer 341 functions as a transmissive area, whereby the transflective display is made possible.

While the reflective layer 341 is formed on a lower half of the display area in the example of FIG. 19, the reflective layer 341 may be formed on an upper half. In addition, while the reflective layer 341 is formed on the side of the electrode substrate 10 in the example, the reflective layer 341 may be formed on the side of the counter substrate 20 since the reflective layer 341 is insulated from the signal electrode 110 in the IPS mode and thus does not contribute to generating a transverse electric field like the FFS mode.

Eleventh Exemplary Embodiment

Next, an eleventh exemplary embodiment will be described. The eleventh exemplary embodiment relates to adjustment of electric field intensity in the IPS mode. As described above, the transflective display is made possible by partially forming a reflective layer within a single pixel area. However, since a transmissive light component passes through a liquid crystal layer once but a reflective light component passes twice, the transmissive light component and the reflective light component are different from each other in an amount of birefringence resulting from the passage of the liquid crystal layer. Therefore, the electric filed intensity is adjusted by controlling a distance between the signal electrode and the pixel electrode, thereby adjusting the amount of birefringence of the transmissive and reflective light components.

Figure 20:
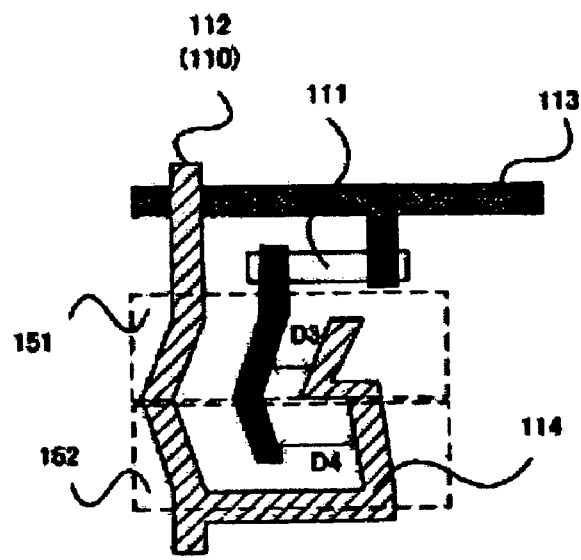
FIG. 20 is a schematic plan view showing an electrode structure according to an eleventh exemplary embodiment.

FIG. 20 is a schematic that shows an example of an electrode structure according to the present exemplary embodiment. In the above-mentioned IPS mode electrode structure, a transmissive area 151 is formed on an upper area and a reflective area 152 is formed on a lower area. It is possible to set the electric field intensity of the reflective area 152 to be a half of that of the transmissive area 151 by setting an electrode gap D4 of the reflective area 152 to be twice the electrode gap D3 of the transmissive area 151. In such a manner, it is possible to equalize the transmissive light component, which passes through the transmissive area

151 once, and the reflective light component, which passes through the reflective area 152 twice, in the amount of birefringence.

Figure 21:
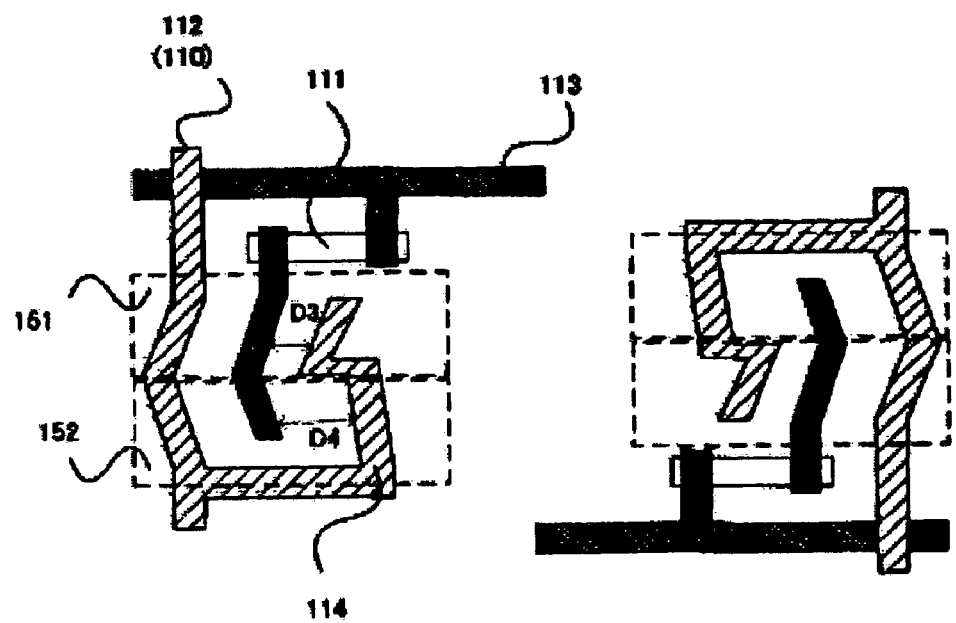
FIG. 21 is a schematic plan view showing an arrangement example of an electrode structure according to the eleventh exemplary embodiment.

Thus, as can be seen from FIG. 20, the reflective area 152 has a wider area than the transmissive area 151. Therefore, when the electrode structure according to the present exemplary embodiment is arranged on the transparent substrate 11, as shown in FIG. 21, it is possible to reduce waste of space on the transparent substrate 11 by forming each pixel so that the transmissive area 151 and the reflective area 152 can be adjacent in neighboring pixels.

[First Driving Method]

Next, a first driving method of a liquid crystal display device 100 having the above-mentioned electrode structure will be described.

(Electric Configuration)

Figure 22:
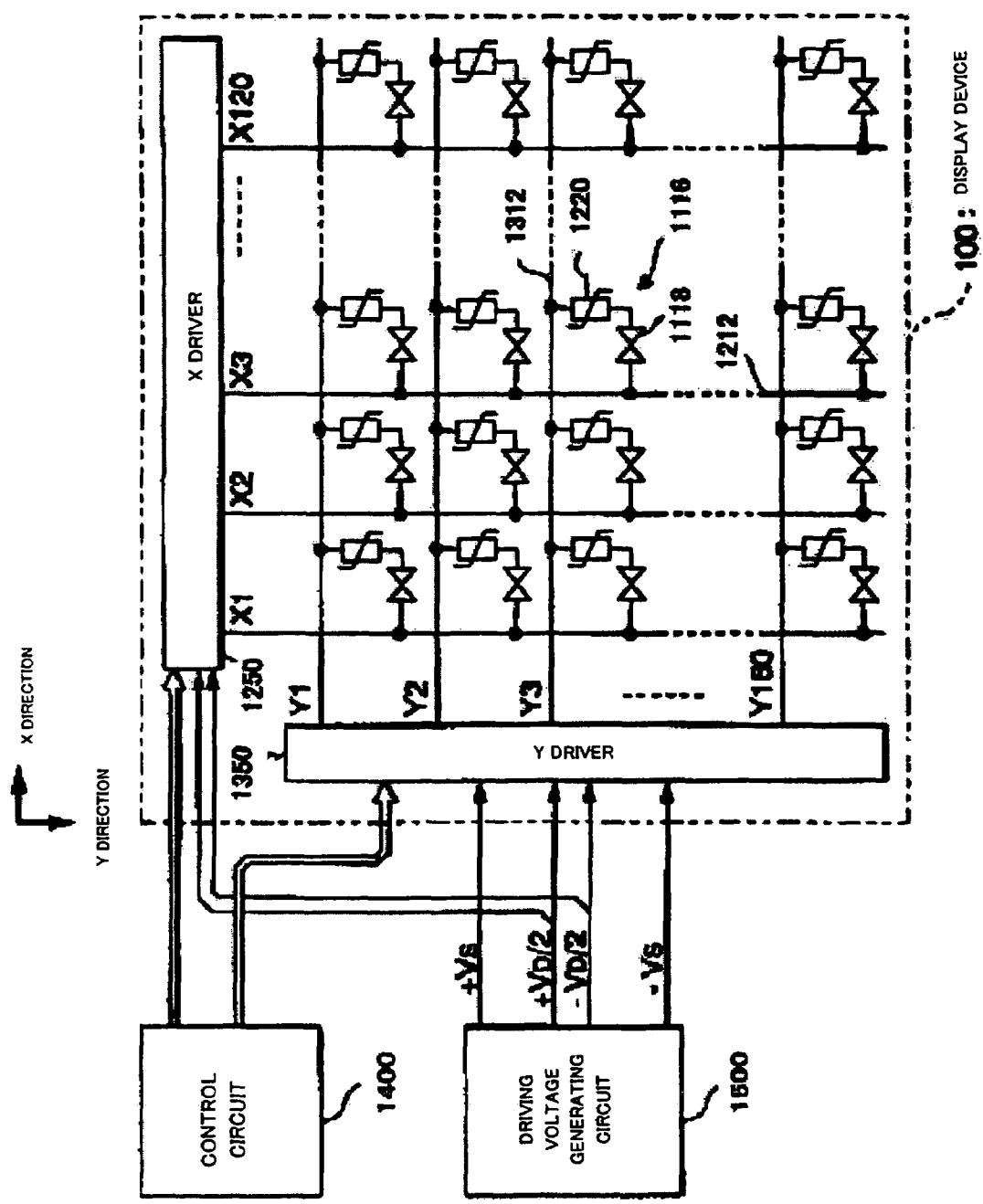
FIG. 22 is a schematic that shows an electric configuration of a display device according to an exemplary embodiment of the present invention.

First, a configuration of a driving circuit of the liquid crystal display device 100 according to the above exemplary embodiment will be described. FIG. 22 is a schematic showing a configuration of a driving circuit of the liquid crystal display device 100.

As shown in FIG. 22, in the liquid crystal display device 100, a plurality of data lines 1212 (corresponding to the signal electrodes 110) is provided in a column (Y) direction, a plurality of scanning lines 1312 (corresponding to the common electrodes 113) is provided in a row (X) direction, and a plurality of pixels 1116 (corresponding to the pixel electrodes 114) is provided at the intersections of the data lines 1212 and the scanning lines 1312. In addition, each of the pixels 1116 includes a liquid crystal capacitor 1118 and a TFD (Thin Film Diode) 1220, an example of a two-terminal switching element, which are serially connected. The liquid crystal capacitor 1118 indicates a capacitor of a liquid crystal layer, an example of electro-optical material, which exists between the pixel electrode 1116 and the data line 1212, as described later.

In the present exemplary embodiment, 160 rows by 120 columns matrix type display device having 160 scanning lines 1312 and 120 data lines 1212 is described for convenience, but exemplary embodiments of the present invention are not limited to this configuration.

A Y driver 1350 is typically called a scanning line driving circuit, and applies scanning signals Y1, Y2, Y3, . . . , Y160 to first, second, third, . . . , 160th scanning lines 1312, respectively. Specifically, the Y driver 1350 selects one of 160 scanning lines 1312 in the following sequence, and applies a selection voltage to the selected scanning line 1312 and applies a non-selection voltage to the rest of the scanning lines 1312, respectively.

In addition, an X driver 1250 is typically called a data line driving circuit, and applies data signals X1, X2, X3, . . . , X120 to the pixels 1116 located on the scanning lines 1312 selected by the Y driver 1350 through data lines 1212 corresponding to display contents, respectively. The detailed configuration of the X driver 1250 and the Y driver 1350 will be described later.

Meanwhile, a control circuit 1400 controls the X driver 1250 and the Y driver 1350 by applying grayscale data described below, various control signals and clock signals to the X driver 1250 and the Y driver 1350. In addition, a driving voltage generating circuit 1500 generates a voltage of $\pm V_S$ and a voltage of $\pm V_D/2$.

In the present exemplary embodiment, a voltage of $\pm V_S$ is used as a selection voltage in the scanning signal, and a voltage of $\pm V_D/2$ is used as both a non-selection voltage in the scanning signal and a data voltage in the data signal. In addition, while a voltage of $\pm V_D/2$ is not necessarily to be used as both a non-selection voltage and a data voltage, the configuration becomes complicated with an increase in the number of voltages which the driving voltage forming circuit 500 generates.

In addition, in the present exemplary embodiment, a polarity reference of a voltage applied to the scanning line 1312 or the data line 1212 is an intermediate voltage (a virtual voltage) of a data voltage $\pm V_D/2$ applied to the data line 1212. A higher voltage than the intermediate voltage is determined to be positive and a lower voltage is negative.

(Control Circuit)

Next, among various signals such as control signals or clock signals generated by the control circuit 1400 of FIG. 22, signals which are used in a Y (vertical scanning) side will be described.

Figure 24:
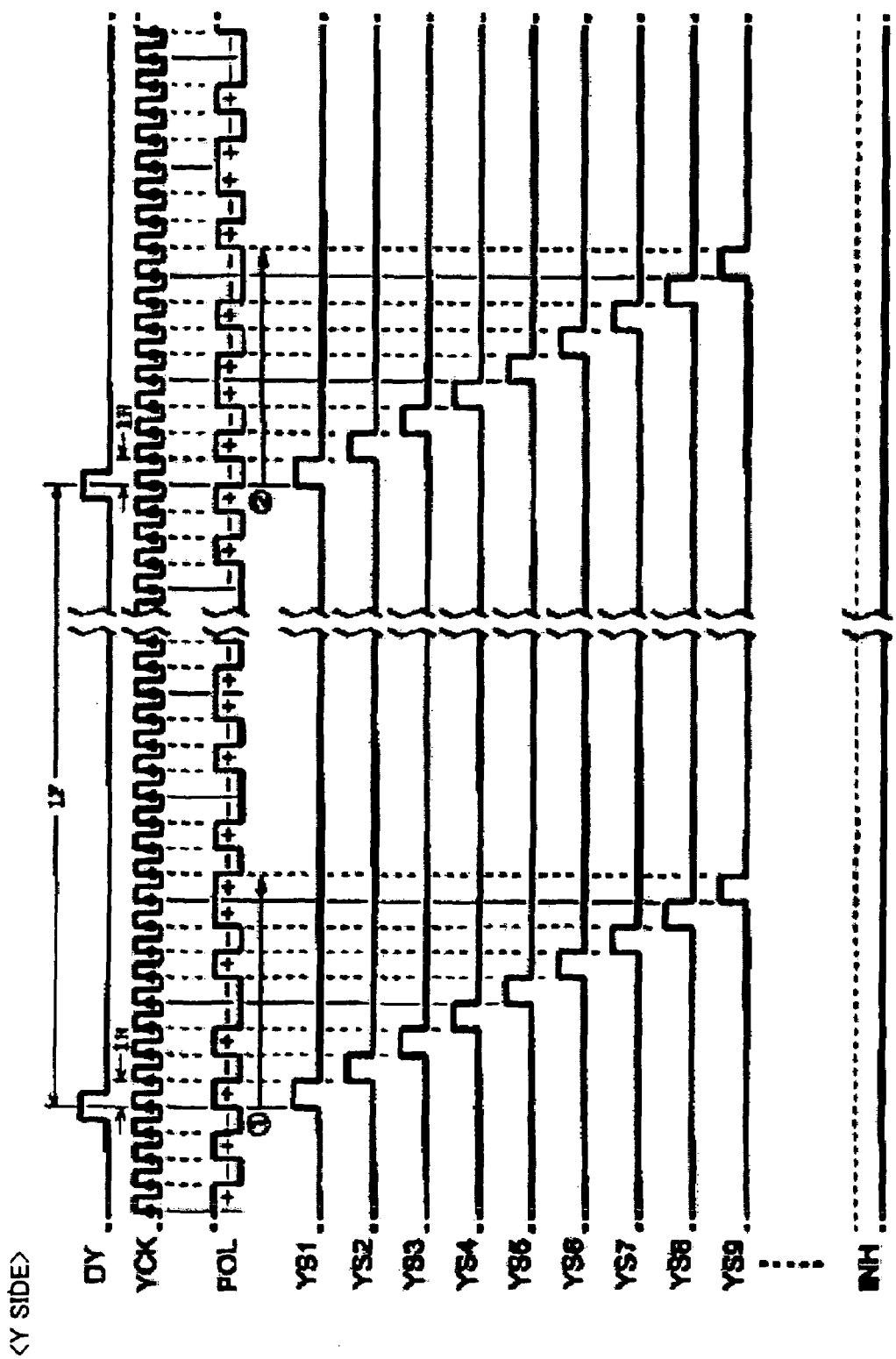
FIG. 24 is a timing chart for explaining an operation of the Y driver.

First, a start pulse DY is a pulse output for the first time in one vertical scanning period (1F) as shown in FIG. 24.

Secondly, a clock signal YCK is a reference signal on the Y side, and has one horizontal scanning period (1H) as shown in FIG. 24.

Thirdly, a polarity indicating signal POL is a signal indicating a polarity of a selected voltage in the scanning signal, is output according to a table shown in FIG. 26, and has a logic level as shown in FIG. 24. Specifically, in case of the polarity indicating signal POL, a logic level is inverted every one horizontal scanning period (1H) in four horizontal scanning period (block period) where four scanning lines constituting one block are selected, and a logic level in a first one horizontal scanning period of the next block period is the same as a logic level in a last one horizontal scanning period of immediately preceding block period. In addition, in the polarity indicating signal POL, logic levels are in an inverted relation between a vertical scanning period (frame) and immediately preceding and following vertical scanning periods in order to drive an alternative current. In FIG. 24, '+' denotes applying a positive selection voltage and '−' denotes applying a negative selection voltage.

Next, signals which are used in an X (horizontal scanning) side will be described.

Figure 28:
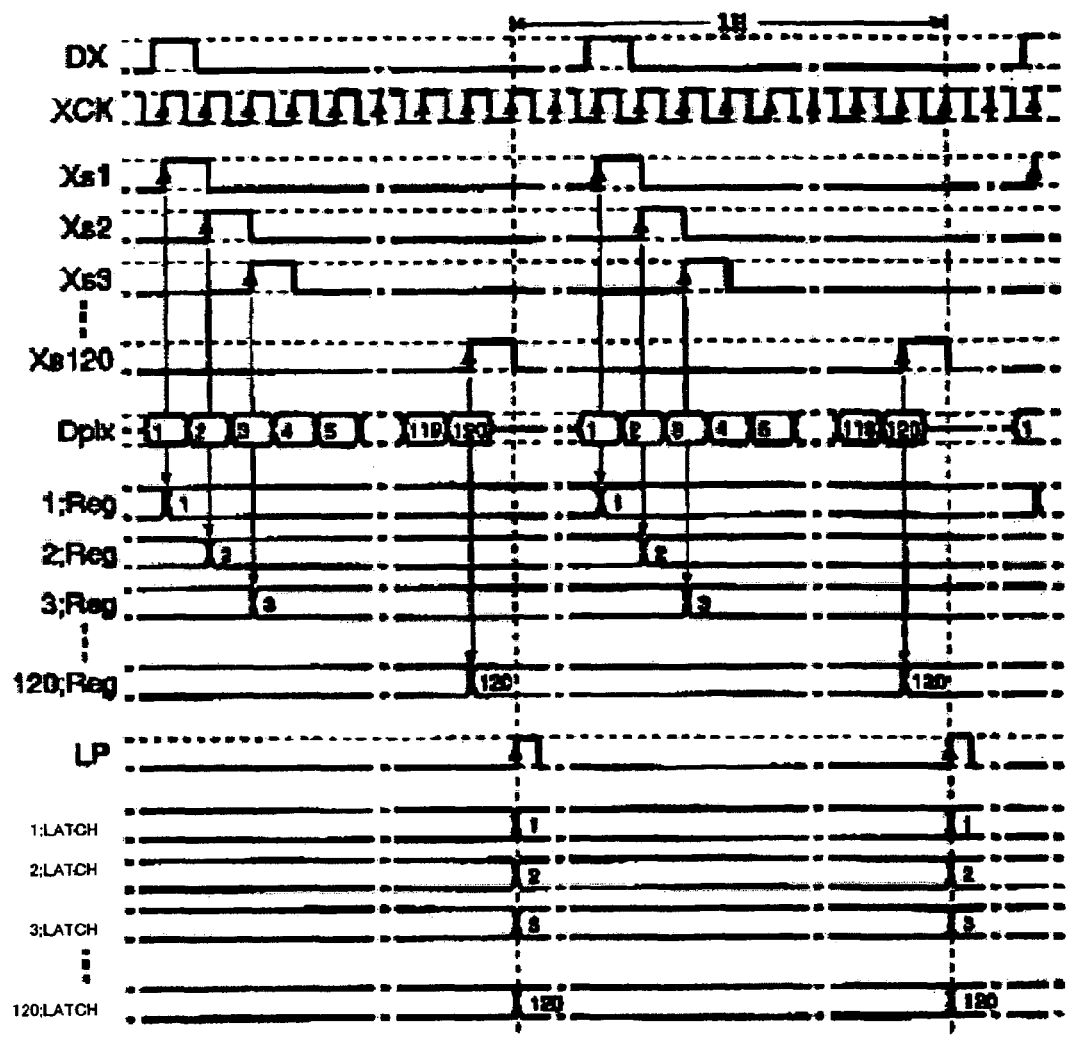
FIG. 28 is a timing chart for explaining an operation of the X driver.

First, a start pulse DX is a pulse output in a supply start timing of grayscale data Dpix corresponding one row, as shown in FIG. 28. The grayscale data Dpix is data indicating grayscale of a pixel, and has three bits in the present exemplary embodiment for the sake of convenience. Therefore, a display device according to the present exemplary embodiment displays 8 ($=2^3$) grayscales for each pixel according to the 3-bit grayscale data Dpix.

Secondly, a clock signal XCK is a reference signal on an X side, and has a cycle corresponding to a period where the grayscale data Dpix corresponding to one pixel is supplied, as shown in FIG. 28.

Thirdly, a latch pulse LP is a pulse generated at the beginning of one horizontal scanning period (1H), and is a pulse output in timing after the grayscale data Dpix corresponding to one row is supplied, as shown in FIG. 28.

Figure 29:
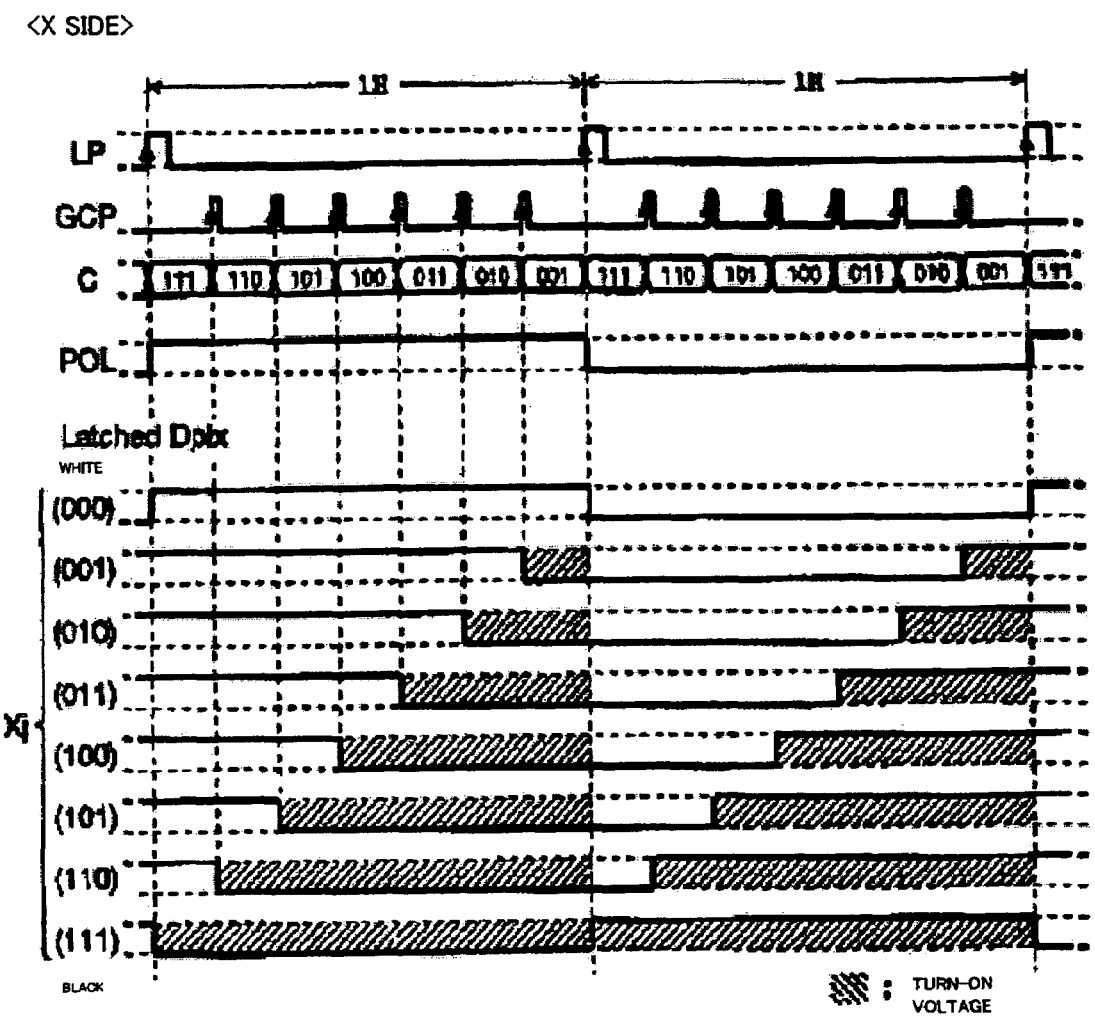
FIG. 29 is a timing chart showing a voltage waveform of a data signal by means of the X driver.

Fourth, a grayscale code pulse GCP is a pulse arranged in a position of a period corresponding to an intermediate grayscale in one horizontal scanning period (1H), as shown in FIG. 29. In exemplary embodiments of the present invention, assuming that the 3-bit grayscale data Dpix of (000) indicates a white color and (111) indicates a black color, the grayscale code pulse GCP arranges pulses corresponding to (110), (101), (100), (011), (010), and (001) of a gray color rather than a white or black color during one horizontal scanning period (1H). In FIG. 29, the grayscale code pulse GCP is actually set by considering voltage-intensity characteristics (V-I characteristics) of a pixel.

(Y Driver)

Figure 23:
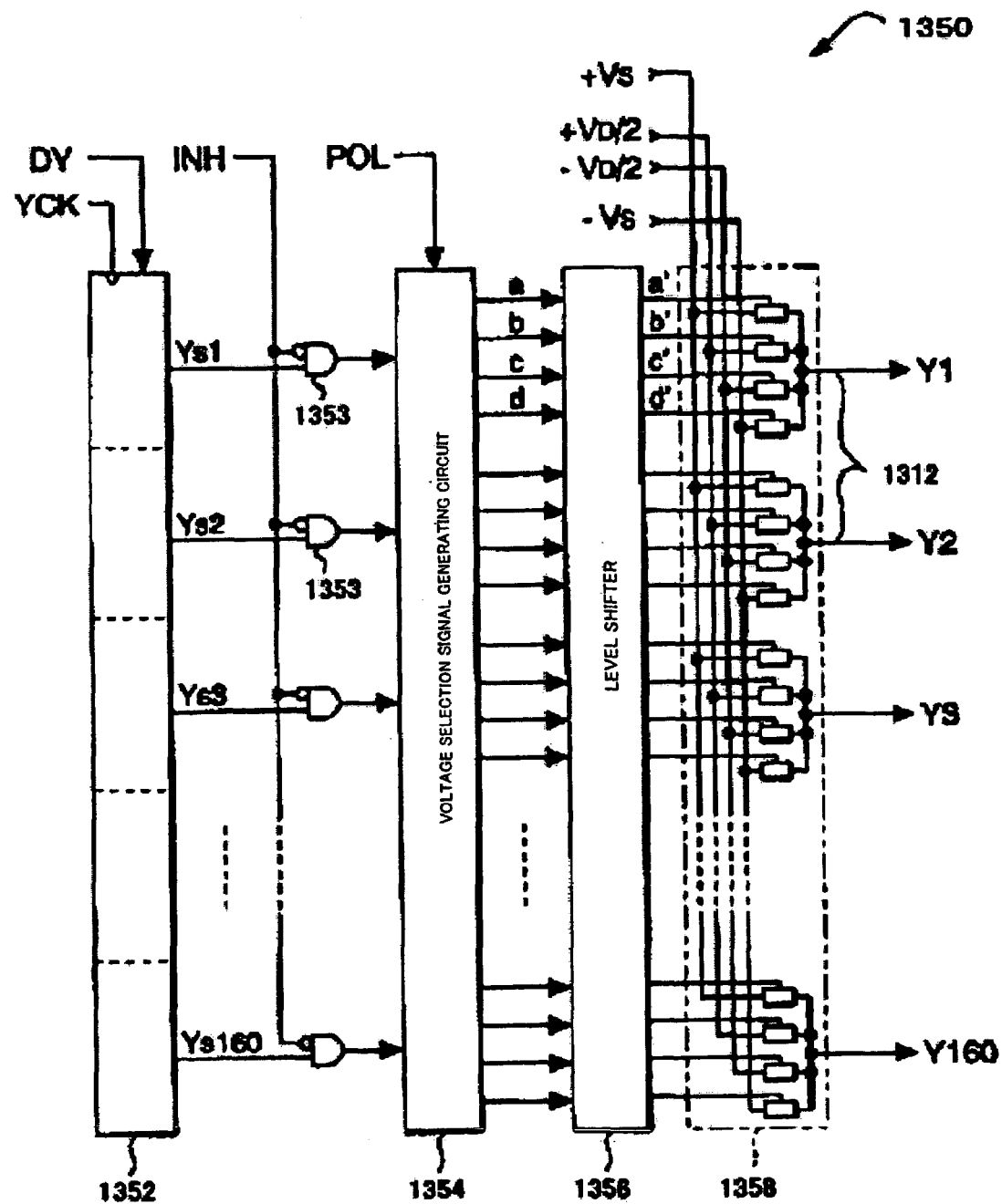
FIG. 23 is a schematic that shows a configuration of a Y driver in a liquid crystal display device.

Next, a Y driver 1350 will be described in detail. FIG. 23 is a block diagram showing a configuration of the Y driver 1350. A shift register 1352 is a 160-bit shift register corresponding to the total number of the scanning lines 1312.

Specifically, the shift register 1352 shifts sequentially a start pulse DY applied first in one vertical scanning period according to a clock signal YCK to sequentially output transmission signals Ys1, Ys2, Ys3, . . . , Ys160. The transmission signals Ys1, Ys2, Ys3, . . . , Ys160 correspond to first, second, third, . . . , and 160th scanning lines 1312, respectively. When several transmission signals become H levels, corresponding scanning lines 1312 are selected.

Next, each of the transmission signals Ys1, Ys2, Ys3, . . . , Ys160 is supplied to one end of an AND circuit 1353 provided on each of corresponding rows. Meanwhile, an inverted signal of a control signal INH is applied to the other end of the AND circuit 1353 on each row. However, since the control signal INH is always in an L level in the present exemplary embodiment, an output of the AND circuit 1353 on each row is the same as each of the transmission signals Ys1, Ys2, Ys3, . . . , Ys160.

Next, a voltage selection signal generating circuit 1354 receives the polarity indication signal POL in addition to the transmission signals Ys1, Ys2, Ys3, . . . , Ys160, and outputs any one of voltage selection signals a, b, c, and d, which determines voltages to be applied to the scanning lines 1312, to any one of the scanning lines 1312.

In the present exemplary embodiment, voltages of scanning signals applied to the scanning line 1312 have four values of $+V_S$ (a positive-side selection voltage), $+V_D/2$ (a positive-side non-selection voltage), $-V_S$ (a negative-side non-selection voltage), and $-V_D/2$ (a negative-side selection voltage). The non-selection voltage becomes $+V_D/2$ after the selection voltage $+V_S$ is applied, becomes $-V_D/2$ after the selection voltage $-V_S$ is applied, and is determined depending on an immediately preceding selection voltage.

The voltage selection signal generating circuit 1354 outputs any one of voltage selection signals a, b, c, and d to a single scanning line so that a voltage level of the scanning signal can have the following relation. That is, when required to select a corresponding scanning line 1312 as any one of the transmission signals Ys1, Ys2, Ys3, . . . , Ys160 becomes an H level, the voltage selection signal generating circuit 1354 sets a voltage level of a scanning signal in the scanning line 1312 to be a selection voltage having a polarity corresponding to a signal level of a polarity indicating signal POL. Next, when the transmission signal goes to an L level, the voltage selection signal generating circuit 1354 generates a voltage selection signal to become a non-selection voltage corresponding to the selection voltage.

Specifically, if a polarity indicating signal POL is in an H level when a transmission signal becomes an H level, the voltage selection signal generating circuit 1354 outputs a voltage selection signal a which selects a positive-side selection voltage $+V_S$ to a row corresponding to the transmission signal in a corresponding period. Then, if the transmission signal becomes an L level, the voltage selection signal generating circuit 1354 outputs a voltage selection signal b which selects a positive-side non-selection voltage $+V_D/2$. Meanwhile, if the polarity indicating signal POL is in an L level when the transmission signal becomes an H level, the voltage selection signal generating circuit 1354 outputs a voltage selection signal c which selects a negative-side selection voltage $-V_S$ to a row corresponding to the transmission signal in a corresponding period. If the transmission signal becomes an L level, the voltage selection signal generating circuit 1354 outputs a voltage selection signal d which selects a negative-side non-selection voltage $-V_D/2$.

Next, a level shifter 1356 magnifies voltage amplitudes of the voltage selection signals a, b, c, and d outputted from the voltage selection signal generating circuit 1354.

A selector 1358 selects a voltage indicated by the voltage selection signals a', b', c' or d' having magnified amplitudes and applies the selected voltage as a scanning signal to each of the corresponding scanning lines 1312.

(Voltage Waveform of Scanning Signal)

Next, in order to explain a voltage waveform of a scanning signal, an operation of the Y driver 1350 will be described.

As shown in FIG. 24, when a start pulse DY is supplied at the beginning of one vertical scanning period (1F), the start pulse DY is transmitted by the shift register 1352 according to the clock signal YCK, whereby the transmission signals become H levels in the sequence of Ys1, Ys2, Ys3, . . . , Ys160.

Meanwhile, as described above, a voltage of a scanning signal is indicated by a logical level of the polarity indicating signal POL when a corresponding transmission signal becomes an H level. In an i-th row scanning line 1312, if a polarity indicating signal POL is in an H level when a transmission signal Ysi becomes an H level, a scanning signal Yi supplied to the scanning line becomes a positive-side selection voltage $+V_S$, and then is held at the positive-side non-selection voltage $+V_D/2$. Meanwhile, if the polarity indicating signal POL is in an L level when the transmission signal Ysi becomes an H level, the scanning signal Yi becomes a negative-side selection voltage $-V_S$, and then is held at a negative-side non-selection voltage $-V_D/2$.

Figure 25:
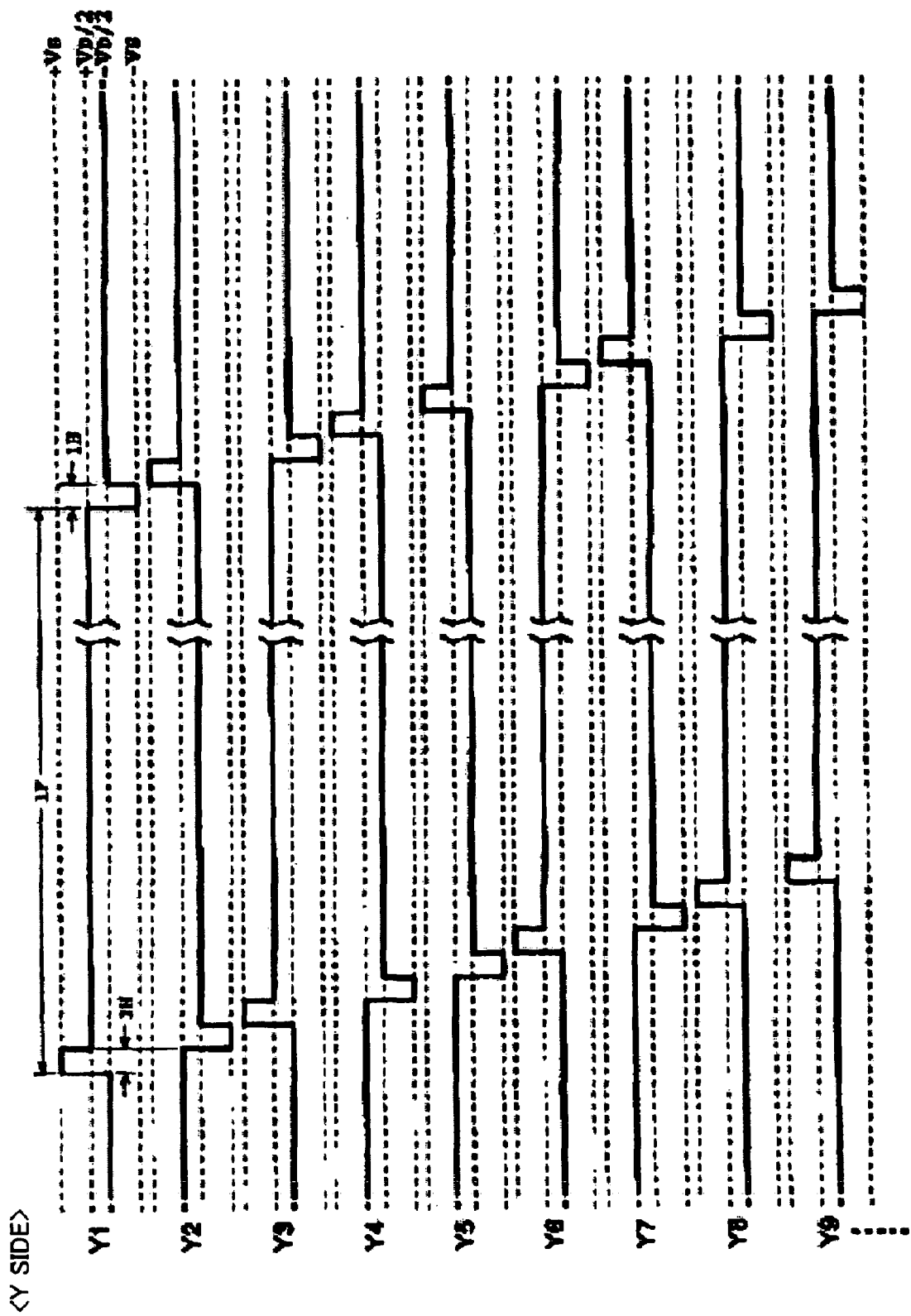
FIG. 25 is a schematic that shows a voltage waveform of a scanning signal by means of the Y driver.

In addition, the polarity indicating signal POL is output by a control circuit 1400 according to a time table as shown in FIG. 26. Thus, a voltage waveform of each scanning signal is the same as shown in FIG. 25.

That is, since the polarity indicating signal POL is level-inverted every one horizontal scanning period during a period where four scanning lines 1312 constituting one block are selected (see FIG. 24), the scanning signal is polarity-inverted every signal. That is, a positive-side selection voltage or a negative-side selection voltage is alternatively selected every one horizontal scanning period (1H).

In the polarity indicating signal POL, a logic level in a period where a scanning signal 1312 is finally selected in a certain block is the same as a logic level in a period where the scanning line 1312 is firstly selected in an immediately following block. Thus, selection voltages supplied to two scanning lines 1312 located on a boundary of a block have the same polarity.

In the same scanning line 1312, the logic level of the polarity indicating signal POL is inverted every one vertical scanning period (see FIGS. 24 and 26). Therefore, if a selection voltage is, for example, a positive-side selection voltage $+V_S$ when a certain scanning line is selected in a certain vertical scanning period, the selection voltage becomes a negative-side selection voltage $-V_S$ when the scanning line is selected in the following vertical scanning period.

(X Driver)

Figure 27:
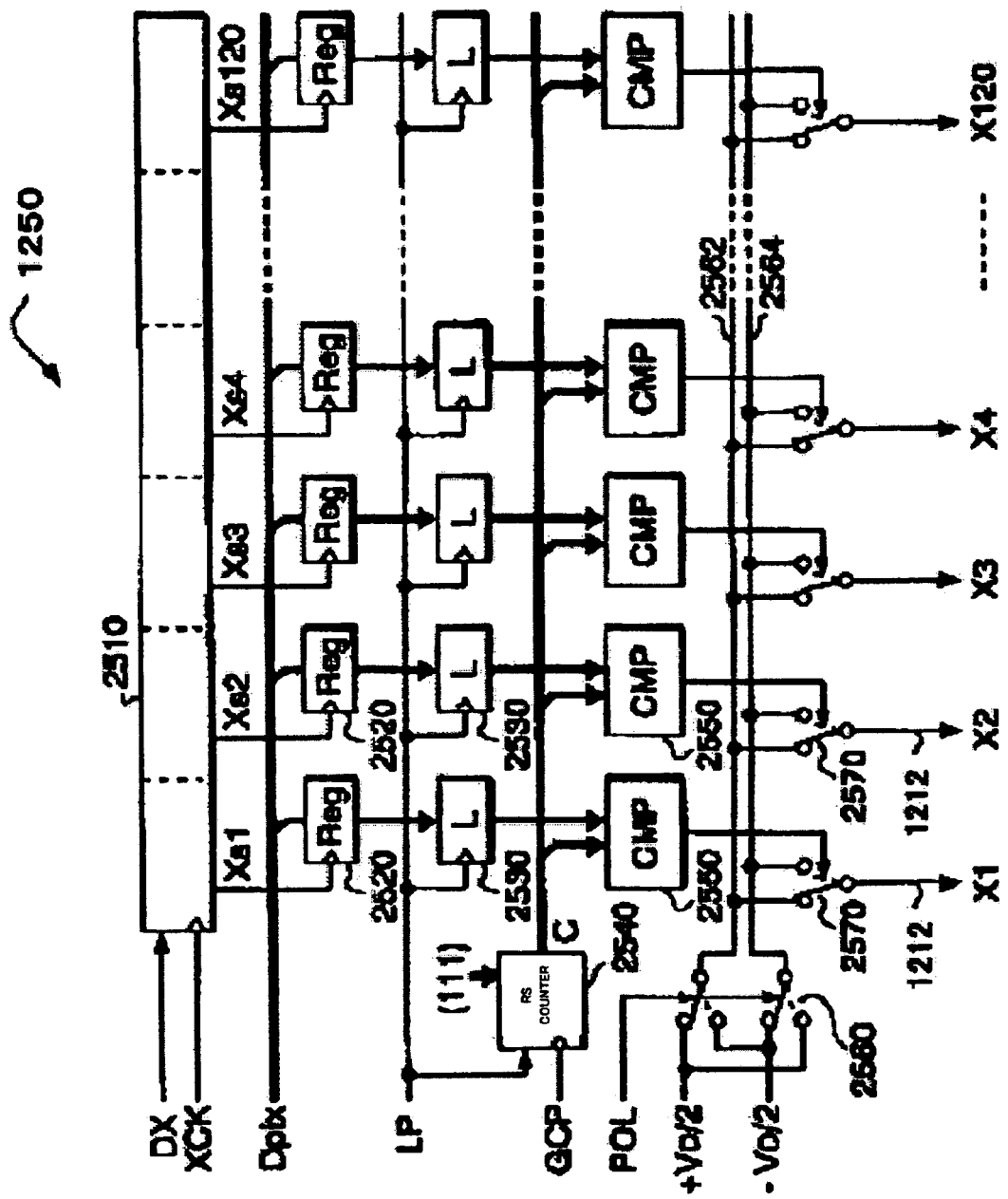
FIG. 27 is a schematic that shows a configuration of an X driver according to a first driving method.

Next, an X driver 1250 will be described in detail. FIG. 27 is a schematic showing a configuration of the X driver 1250. A shift register 2510 shifts sequentially a start pulse DX output in a supply start timing of the grayscale data Dpix corresponding to one row whenever a clock signal XCK is generated, and then outputs as sampling control signals Xs1, Xs2, Xs3, . . . , Xs120.

Next, a register (Reg) 2520 is provided in one-to-one correspondence with a data line 1212, and samples 3-bit grayscale data Dpix supplied in synchronization with the clock signal XCK when a sampling control signal is generated. In addition, a latch circuit (L) 2530 is provided in one-to-one correspondence with the register 2520, and latches and outputs the grayscale data Dpix held by a corresponding register 2520 by a latch pulse LP generated at the beginning of a horizontal scanning period.

Meanwhile, a counter 2540 sets (111) corresponding to a black color of the grayscale data to be an initial value when a latch pulse LP is generated, the initial value is counted inversely whenever the grayscale code pulse GCP is generated, and then outputs the count result C.

Next, a comparator (CMP) 2550 is provided in one-to-one correspondence with the latch circuit 2530. The comparator 2550 compares the count result C by the counter 2540 with the grayscale data Dpix latched by a corresponding latch circuit 2530, and outputs an H level signal when the latter is greater than the former.

A switch 2560 is in a position indicated by a solid line in FIG. 27 when the polarity indicating signal POL is in an H level, and supplies a data voltage $+V_D/2$ to a voltage supply line 2562 and a data voltage $-V_D/2$ to a voltage supply line 2564, respectively. In addition, the switch 2560 is in a position indicated by a broken line in FIG. 27 when the polarity indicating signal POL is in an L level, and supplies a data voltage $+V_D/2$ to a voltage supply line 2564 and a data voltage $-V_D/2$ to a voltage supply line 2562, respectively.

A switch 2570 is provided in one-to-one correspondence with the comparator 2550, that is, in one-to-one correspondence with the data line 1212. Specifically, the switch 2570 selects the voltage supply line 2562 as shown by a solid line in FIG. 27 when a signal indicating a comparison result from the comparator 2550 is in an L level. In addition, the switch 2570 selects the voltage supply line 2564 as shown by a broken line in FIG. 27 when the signal indicating the comparison result is in an H level. Then, the switch 2570 applies a data voltage supplied to the selected voltage supply line to a corresponding data line 1212 as a data signal.

(Voltage Waveform of Data Signal)

Next, in order to explain a voltage waveform of a data signal, an operation of the X driver 1350 will be described.

As shown in FIG. 28, when a start pulse DX rises to an H level, gray data Dpix corresponding to first, second, third, . . . , 120th column pixels in a certain row are sequentially supplied.

If a sampling control signal Xs1 output from the shift register 2510 rises to an H level in a timing when the grayscale data Dpix corresponding to a first column pixel is supplied, the grayscale data is sampled by the register 2520 corresponding to a first column.

Next, if a sampling control signal Xs2 rises to an H level in timing when the grayscale data Dpix corresponding to a second column pixel is supplied, the grayscale data is sampled by the register 2520 corresponding to a second column. Similarly, each of the grayscale data Dpix corresponding to third, fourth, . . . , 120th pixels is sampled by the register 2520 corresponding to third, fourth, . . . , 120th columns.

Next, when a latch pulse LP is output (when the logic level rises to an H level), the grayscale data Dpix sampled by the register 2520 corresponding to each column is simultaneously latched by a latch circuit 2530 corresponding to each column. The comparator 2550 compares the latched grayscale data Dpix with the count result C by a counter 2540.

Meanwhile, as shown in FIG. 29, the count result C is a value obtained by downcounting (111) set with the generation of the latch pulse LP by means of the counter 2550 whenever the grayscale code pulse GCP generates.

It is typically considered that the grayscale data Dpix latched by a j-th column latch circuit 2530 is (000) corresponding to a white color. In this case, since the count result C does not become less than the latched (000) although the grayscale code pulse GCP is output six times after the latch pulse LP is output, an output signal by a j-th column comparator 2550 holds an L level over one horizontal scanning period regulated by the latch pulse LP. Thus, a selection of a voltage supply line 2562 is held in a j-th column switch 2570.

Since a voltage $+V_D/2$ is supplied to the voltage supply line 2562 by a switch 2560 when the polarity indicating signal POL is in an H level in the horizontal scanning period, a data signal Xj is held at a voltage $+V_D/2$ over the horizontal scanning period, as shown in FIG. 29.

On the contrary, since a voltage $-V_D/2$ is supplied to the voltage supply line 2562 by the switch 2560 when the polarity indicating signal POL is in an L level in the horizontal scanning period, a data signal Xj is held at a voltage $-V_D/2$ over the horizontal scanning period, as shown in FIG. 29.

Next, it is typically considered that the grayscale data Dpix latched by a j-th column latch circuit 2530 is, for example, (100) corresponding to a gray color. In this case, since the count result C becomes less than the latched (100) when the grayscale code pulse GCP is output three times after the latch pulse LP is output, the output signal from a j-th comparator 2550 transits from an L level to an H level at that time. Thus, a selection in a j-th column switch 2570 changes from the voltage supply line 2562 to the voltage supply line 2564 at that time.

Since a voltage $+V_D/2$ is supplied to the voltage supply line 2562 and a voltage $-V_D/2$ is supplied to the voltage supply line 2564 by the switch 2560 if the polarity indicating signal POL is in an H level in the horizontal scanning period, the data signal Xj changes from a voltage $+V_D/2$ to a voltage $-V_D/2$ at that time, as shown in FIG. 29.

On the contrary, since a voltage $-V_D/2$ is supplied to the voltage supply line 2562 and a voltage $+V_D/2$ is supplied to the voltage supply line 2564 by the switch 2560 if the polarity indicating signal POL is in an L level in the horizontal scanning period, the data signal Xj changes from a voltage $-V_D/2$ to a voltage $+V_D/2$ at that time, as shown in FIG. 29.

Event when the latched grayscale data Dpix corresponds to a gray color except (100), the above-mentioned description is applied except that a transit timing of an output signal by the comparator 2550 is different.

In addition, it is typically considered the grayscale data Dpix latched by the j-th column latch circuit 2530 is (111) corresponding to a black color. In this case, since the count result C becomes less than the latched (111) when the latch pulse LP is output, an output signal from the j-th column comparator 2550 is held at an H level over one horizontal scanning period regulated by the latch pulse LP. Thus, a selection of the voltage supply line 2564 is held in the j-th column switch 2570.

Since a voltage $-V_D/2$ is supplied to the voltage supply line 2564 by the switch 2560 when the polarity indicating signal POL is in an H level in the horizontal scanning period, the data signal Xj is held at a voltage $-V_D/2$ over the horizontal scanning period as shown in FIG. 29.

On the contrary, since a voltage $+V_D/2$ is supplied to the voltage supply line 2562 by the switch 2560 when the polarity indicating signal POL is in an L level in the horizontal scanning period, the data signal Xj is held at a voltage $+V_D/2$ over the horizontal scanning period as shown in FIG. 29.

Therefore, when the grayscale data Dpix latched by the latch circuit 2530 is the same, both the data signal Xj in a case when the polarity indicating signal POL is in an H level, and the data signal Xj in a case when the polarity indicating signal POL is in an L level are in an inverted relation to a central voltage (reference voltage of polarity) of a data voltage $\pm V_D/2$.

(Improvement of Transverse Irregularity)

In the above-mentioned first driving method, it is possible to reduce or prevent occurrence of vertical crosstalk and reduce power consumption of the liquid crystal display device 100. However, if the above driving method is applied to a general vertical electric field driving mode liquid crystal panel, transverse irregularity may be displayed on a boundary of a block which integrates a plurality of scanning lines due to a capacitive coupling between pixel electrodes. For this reason, in a related art vertical electric field driving mode liquid crystal panel, an additional shield structure is provided between pixel electrodes.

In this regard, in the liquid crystal display device 100 according to each exemplary embodiment of the present invention, for example, as shown in FIG. 2, each of the pixel electrodes 114 is surrounded by a substantially U-shaped signal electrode 110 to be electrically shielded. Therefore, even though the above driving method is applied, it is possible to reduce or prevent occurrence of transverse irregularity without providing an additional shield structure, thereby displaying bright and uniform images.

[Second Exemplary Driving Method]

Next, a second exemplary driving method of the liquid crystal display device 100 having the above-mentioned electrode structure will be described. In the first exemplary driving method, a driving voltage is generated by pulse width modulation based on a grayscale value of display data and is applied as a data signal to the data line 1212. That is, the grayscale of display data is regulated by a pulse width of the data signal applied to the data line 1212. Meanwhile, in the second driving method, a driving voltage is generated by voltage modulation based on display data and is applied as a data signal to the data line 1212. That is, in the second exemplary driving method, the grayscale of display data is regulated by a voltage of the data signal applied to the data line 1212.

The entire configuration of a driving circuit of the liquid crystal display device 100 according to the second exemplary driving method is basically the same as that of a driving circuit according to the first exemplary driving method shown in FIG. 22. While the X driver 1250 generates data signals X1 through X120 by pulse width modulation using a grayscale value of display data in the first exemplary driving method, the X driver generates the data signals X1 through X120 by voltage modulation using a grayscale value of display data in the second exemplary driving method. Except this, since the second exemplary driving method is basically the same as the first exemplary driving method, the detailed description will be omitted.

Figure 30:
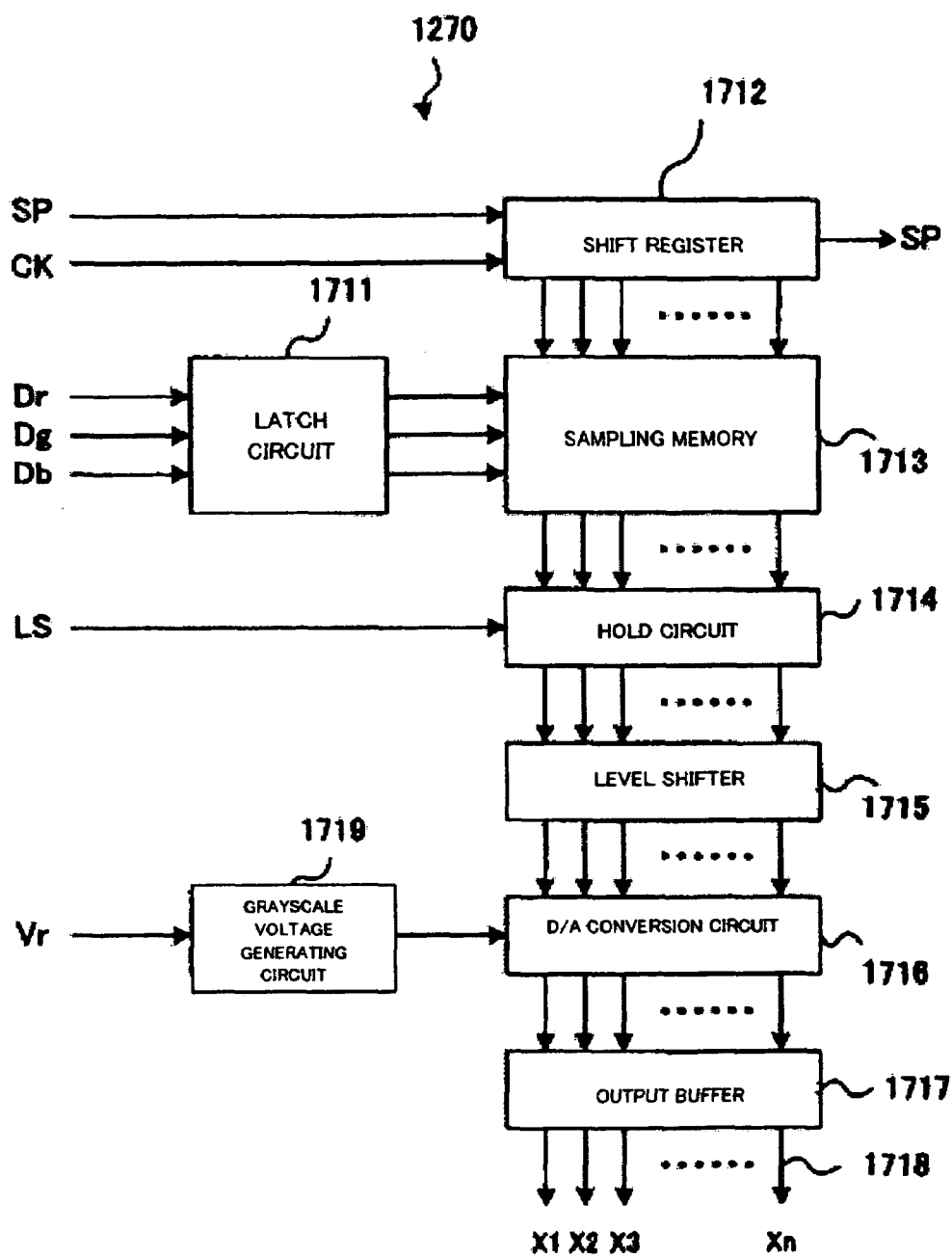
FIG. 30 is a schematic that shows a configuration of an X driver according to a second driving method.

FIG. 30 is a schematic that shows an X driver according to the second exemplary driving method. As shown in FIG. 30, an X driver 1270 according to the second exemplary driving method comprises a latch circuit 1711, a shift register 1712, a sampling memory 1713, a hold circuit 1714, a level shifter 1715, a D/A converter 1716, an output buffer 1717, and a grayscale voltage generating circuit 1719.

A start pulse signal SP, a clock signal CK, a digital display data Drgb (Dr, Dg, Db), a latch signal LS, and a reference voltage Vr are input to the X driver 1270. Display data Drgb is latched by a latch circuit 1711. Meanwhile, the start pulse signal SP to control transmission of display data Drgb is transmitted to the shift register 1712 in synchronization with the clock signal CK and is supplied as the start pulse signal SP from a last end of the shift register 1712 to the following X driver.

Display data Drgb latched by the latch circuit 1711 is temporarily stored within a memory 1713 sampled on a time division basis, in synchronization with an output signal from each end of the shift register 1712. In addition, the temporarily stored display data Drgb is supplied to the hold circuit 1714.

When display data corresponding to one line of display image are stored in the sampling memory 1713, the hold circuit 1714 receives an output signal from the sampling memory 1713 based on a latch signal LS (=horizontal synchronizing signal). The hold circuit 1714 outputs the output signal to the level shifter 1715, and holds the signal until a next latch signal LS is input.

The level shifter 1715 changes a level of the signal held by the hold circuit 1714 so as to adapt to an A/D conversion circuit 1718 which processes a level of voltage applied to a liquid crystal display panel. A grayscale voltage generating circuit 1719 generates a plurality of analog voltages for grayscale display based on a reference voltage Vr supplied from a power source, and supplied to a D/A conversion circuit 1716. The D/A conversion circuit 1716 selects a single analogue voltage from a plurality of analog voltages supplied from the grayscale voltage generating circuit 1719 based on display data which are level-converted by the level shifter. The analog voltage defines grayscale of display data, and is output as data signals X1 through X120 through an output buffer 1717.

(Improvement of Vertical Crosstalk)

If the above-mentioned second exemplary driving method is applied to a typical vertical electric field driving mode liquid crystal panel, an effective voltage applied to a pixel electrode can change due to a capacitive coupling between a pixel electrode and a signal electrode which is connected to a pixel adjacent to the pixel, thereby occurring a vertical crosstalk. For this reason, in a related art vertical electric field driving mode liquid crystal panel, an additional shield structure is provided between the pixel electrodes.

In this regard, in the liquid crystal display device 100 according to each exemplary embodiment of the present invention, for example, as shown in FIG. 2, each of the pixel electrodes 114 is electrically shielded by a substantially U-shaped signal electrode 110. Therefore, even though the above driving method is applied, it is possible to reduce or prevent occurrence of the vertical crosstalk without providing an additional shield structure, thereby displaying bright and uniform images.

[Electronic Apparatus]

Next, an exemplary embodiment in which a liquid crystal display device 100 according to exemplary embodiments of the present invention is used as a display device of an electronic apparatus will be described.

Figure 31:
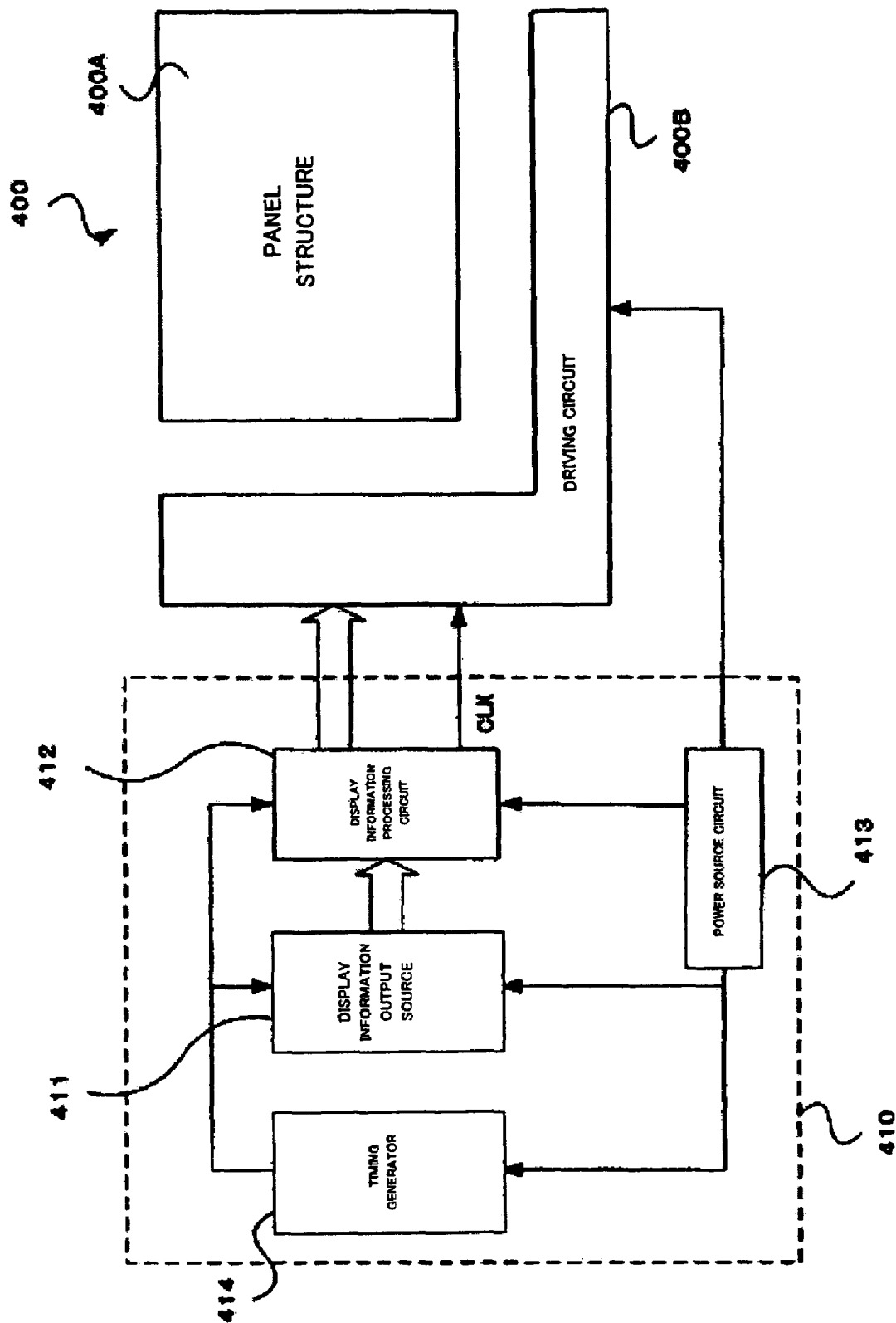
FIG. 31 is a schematic that shows a circuit configuration of an electronic apparatus to which exemplary embodiments of the present invention are applied.

FIG. 31 is a schematic that shows the entire configuration of the present exemplary embodiment. The electronic apparatus comprises a liquid crystal display panel 400 constituting the liquid crystal display device 100, and control device 410 to control the liquid crystal display panel 400. The liquid crystal display panel 400 is conceptually divided into a panel structure 400A and a driving circuit 400B consisting of semiconductor ICs. The control device 410 includes a display information output source 411, a display information processing circuit 412, a power source circuit 413, and a timing generator 414.

The display information output source 411 includes a memory including a ROM (Read Only Memory) or a RAM (Random Access Memory), a storage unit including a magnetic disk or an optical disk, and a resonance circuit to tune a digital image signal. The display information output source 411 applies display information to the display information processing circuit 412 in a predetermined format of image signal based on various clock signals generated by the timing generator 414.

The display information processing circuit 412 includes a serial-parallel conversion circuit, an amplification/inversion circuit, a rotation circuit, a gamma compensation circuit, and a clamp circuit, and processes the input display information to supply the image information to the driving circuit 400B with a clock signal CLK. The driving circuit 400B includes a scanning line driving circuit, a data line driving circuit, and an inspecting circuit. The power source circuit 413 supplies predetermined voltages to the above-mentioned components.

Next, a specific example of an electronic apparatus to which a liquid crystal display panel according to exemplary embodiments of the present invention can be applied will be described with reference to FIGS. 32A and B.

To begin with, an example in which a liquid crystal display panel according to exemplary embodiments of the present invention is applied to a display unit of a portable personal computer (so-called notebook computer) will be described. FIG. 32A is a schematic perspective view showing a configuration of the personal computer. As shown in FIG. 32A, the personal computer 710 comprises a main body 712 provided with a keyboard 711, and a display unit 713 to which a liquid crystal display panel according to exemplary embodiments of the present invention is applied.

Subsequently, an example in which a liquid crystal display panel according to exemplary embodiments of the present invention is applied to a display unit of a cellular phone will be described. FIG. 32B is a perspective view showing a configuration of the cellular phone. As shown in FIG. 32B, the cellular phone 720 includes a plurality of operating buttons 721, a receiver 722, a transmitter 723, and a display unit 724 employing a liquid crystal display panel according to exemplary embodiments of the present invention.

Figure 32A:
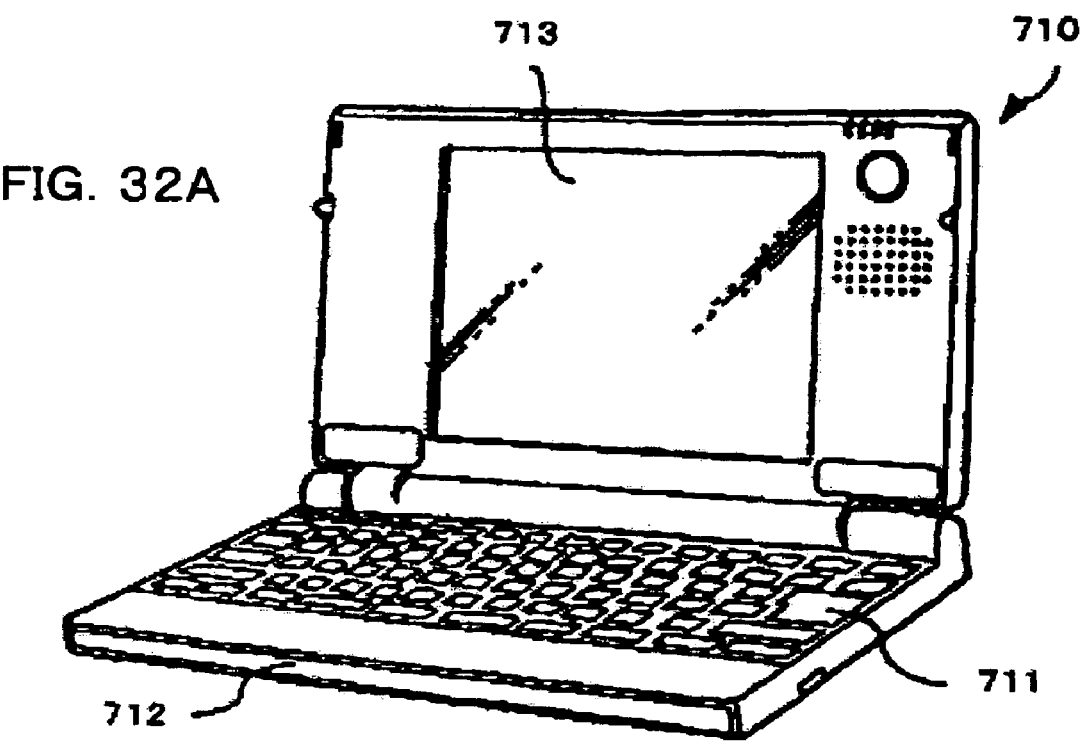
FIGS. 32A and B show an example of an electronic apparatus to which exemplary embodiments of the present invention are applied.
Figure 32B:
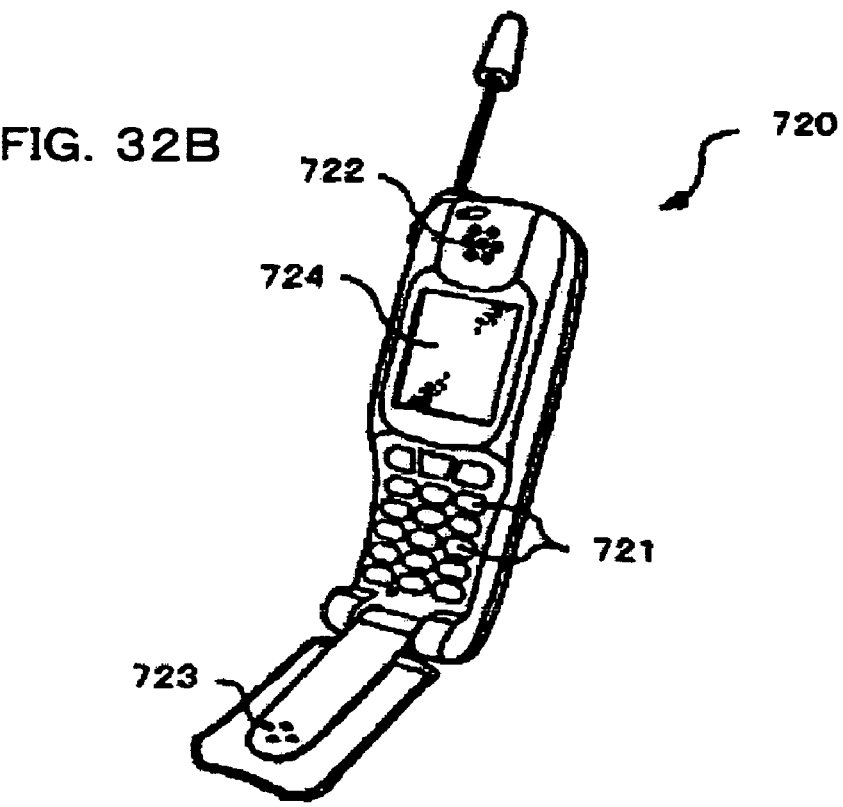

In addition to the personal computer shown in FIG. 32A or the cellular phone shown in FIG. 32B, an electronic apparatus to which the liquid crystal display panel according to exemplary embodiments of the present invention can be applied includes a liquid crystal television, a view finder type or monitor-direct-view type video tape recorder, a car navigation device, a pager, an electronic organizer, a electronic calculator, a word processor, a workstation, a videophone, a POS terminal, and a digital still camera.

Exemplary embodiments of the present invention can also be applied to an electroluminescence device, an organic electroluminescence device, a plasma display device, an electrophoretic display device, and a field emission display, as well as a liquid crystal display device.

What is claimed is:

1. An electro-optical device, comprising:
   a pair of substrates;
   electro-optical material interposed between the pair of substrates;
   signal electrodes on one of the substrates, each signal electrode including a main section, a perpendicular section that extends from the main section in a direction substantially perpendicular to the main section, and an opposing section that extends from an end of the perpendicular section that is remote from the main section and in a direction substantially parallel with the main section;
   common electrodes on the same substrate as the signal electrodes, the common electrodes crossing the signal electrodes and extending in a different direction from the signal electrodes;
   an insulating layer interposed between the signal electrodes and the common electrodes;
   thin film diodes having at least one end;
   one end of each of the thin film diodes being connected to a respective one of the common electrodes; and
   pixel electrodes on the same substrate as the signal electrodes and the common electrodes, each pixel electrode being connected to another end of each of the thin film diodes, each pixel electrode having two sets of opposing sides, each pixel electrode being sandwiched in between the main section and the opposing section of the corresponding signal electrode on one set of opposing sides and between the corresponding common electrode and the perpendicular section of the corresponding signal electrode on the other set of opposing sides.

2. The electro-optical device according to claim 1, the thin film diodes being formed by oxidizing material composing the signal electrodes.

3. The electro-optical device according to claim 1, the insulating layer being formed by oxidizing the signal electrodes.

4. The electro-optical device according to claim 1, a portion of each of the pixel electrodes overlapping a respective one of the signal electrodes with the insulating layer interposed therebetween.

5. The electro-optical device according to claim 1, a portion of the signal electrodes being covered with material composing the common electrodes.

6. The electro-optical device according to claim 1, base electrodes made of common group of electrodes.

7. The electro-optical device according to claim 1, the insulating layer being a resin layer.

8. The electro-optical device according to claim 7, the resin layer being provided only in areas where the signal electrodes and the common electrodes cross each other.

9. The electro-optical device according to claim 7, the resin layer being provided in areas other than areas of the thin film diodes.

10. The electro-optical device according to claim 7, the resin layer being a color filter layer.

11. The electro-optical device according to claim 1, further comprising:
    a single display unit consisting of a single electrode line in the signal electrodes;
    a pair of the thin film diodes provided on both sides of the electrode line; and a pair of pixel electrodes provided on both sides of the electrode line.

12. The electro-optical device according to claim 11, the pair of thin film diodes having different electrical characteristics.

13. The electro-optical device according to claim 11, gaps between the electrode line and each electrode of the pair of pixel electrodes being different from each other.

14. The electro-optical device according to claim 1, each of the pixel electrodes being surrounded by a portion of the signal electrodes, and the electro-optical device further including a driving circuit to apply a scanning voltage to the signal electrodes and to apply a driving voltage voltage-modulated based on display data to the common electrodes.

* * * * *